US011651492B2

(12) United States Patent
Adler et al.

(10) Patent No.: US 11,651,492 B2
(45) Date of Patent: May 16, 2023

(54) METHODS AND SYSTEMS FOR MANUFACTURING PRINTED CIRCUIT BOARD BASED ON X-RAY INSPECTION

(71) Applicant: Bruker Nano, Inc., Santa Barbara, CA (US)

(72) Inventors: David Lewis Adler, San Jose, CA (US); Scott Joseph Jewler, San Jose, CA (US); Freddie Erich Babian, Palo Alto, CA (US); Andrew George Reid, San Jose, CA (US); Benjamin Thomas Adler, San Jose, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 0 days.

(21) Appl. No.: 16/924,747

(22) Filed: Jul. 9, 2020

(65) Prior Publication Data

US 2021/0014979 A1    Jan. 14, 2021

Related U.S. Application Data

(60) Provisional application No. 62/873,752, filed on Jul. 12, 2019.

(51) Int. Cl.
*G01N 23/04* (2018.01)
*G01T 1/20* (2006.01)
(Continued)

(52) U.S. Cl.
CPC ......... *G06T 7/0014* (2013.01); *G01N 23/04* (2013.01); *G01N 23/043* (2013.01);
(Continued)

(58) Field of Classification Search
CPC .................... G01T 1/20; G01N 23/04
See application file for complete search history.

(56) References Cited

U.S. PATENT DOCUMENTS 7,058,474 B2 *   6/2006  Ganot ................. H05K 1/0269
                                                    700/192
8,510,705 B2 *   8/2013  Ye ....................... G06F 30/367
                                                    716/132
(Continued)

FOREIGN PATENT DOCUMENTS

KR       20090011333 A      2/2009
WO    WO-2010109455 A1 *   9/2010  ........... G01N 21/956

OTHER PUBLICATIONS

International Search Report and Written Opinion for International Application No. PCT/US2020/041514, dated Oct. 20, 2020.
(Continued)

*Primary Examiner* — David P Porta
*Assistant Examiner* — Djura Malevic
(74) *Attorney, Agent, or Firm* — Boyle Fredrickson S.C.

(57) ABSTRACT

In one embodiment, an X-ray inspection system may non-destructively inspect a printed circuit board to measure a number of dimensions at a number of pre-determined locations of the printed circuit board. The X-ray inspection system may generate a data set for the printed circuit board based on the measured dimensions. The X-ray inspection system may calculate one or more drilling values based on the data set of the printed circuit board. The X-ray inspection system may provide, to a drilling machine, instructions for drilling a number of plated-through vias based on the calculated drilling values for the printed circuit board.

78 Claims, 16 Drawing Sheets

(51) Int. Cl.
*G06T 7/00* (2017.01)
*G06N 20/00* (2019.01)
*G06F 30/398* (2020.01)
*G01N 23/083* (2018.01)
*G01N 23/18* (2018.01)
*G06K 9/62* (2022.01)
*G06T 5/00* (2006.01)
*H01L 21/67* (2006.01)
*H05K 1/11* (2006.01)
*H05K 3/40* (2006.01)
*G06F 119/18* (2020.01)
*G06F 115/12* (2020.01)

(52) U.S. Cl.
CPC .......... *G01N 23/083* (2013.01); *G01N 23/18* (2013.01); *G01T 1/20* (2013.01); *G06F 30/398* (2020.01); *G06K 9/6256* (2013.01); *G06K 9/6267* (2013.01); *G06N 20/00* (2019.01); *G06T 5/007* (2013.01); *G06T 7/0012* (2013.01); *H01L 21/67288* (2013.01); *H05K 1/115* (2013.01); *H05K 3/4038* (2013.01); *G01N 2223/04* (2013.01); *G01N 2223/401* (2013.01); *G01N 2223/426* (2013.01); *G01N 2223/505* (2013.01); *G01N 2223/6466* (2013.01); *G06F 2115/12* (2020.01); *G06F 2119/18* (2020.01); *G06T 2207/10081* (2013.01); *G06T 2207/10116* (2013.01); *G06T 2207/20024* (2013.01); *G06T 2207/20081* (2013.01); *G06T 2207/20208* (2013.01); *G06T 2207/30004* (2013.01)

(56) References Cited

U.S. PATENT DOCUMENTS

| | | | | |
|---|---|---|---|---|
| 8,535,547 | B2* | 9/2013 | Cho | H05K 3/4679 |
| | | | | 313/631 |
| 10,247,683 | B2* | 4/2019 | Yun | G01N 23/2204 |
| 10,295,485 | B2* | 5/2019 | Yun | G01N 23/087 |
| 10,297,359 | B2* | 5/2019 | Yun | H01J 35/10 |
| 10,352,880 | B2* | 7/2019 | Yun | G21K 1/02 |
| 10,395,362 | B2* | 8/2019 | Gupta | G05B 19/41875 |
| 10,559,396 | B2* | 2/2020 | Adler | G01N 23/04 |
| 10,622,345 | B2* | 4/2020 | Tucker | H01L 27/0207 |
| 11,175,243 | B1* | 11/2021 | Yun | G01N 23/04 |
| 11,270,430 | B2* | 3/2022 | Sezginer | G06T 7/001 |
| 2002/0150398 | A1* | 10/2002 | Choi | G03F 7/707 |
| | | | | 396/428 |
| 2003/0025907 | A1* | 2/2003 | Savareigo | G01N 21/95692 |
| | | | | 356/237.5 |
| 2003/0086600 | A1* | 5/2003 | Ganot | H05K 3/4679 |
| | | | | 382/145 |
| 2003/0118149 | A1 | 6/2003 | Okuda | |
| 2005/0001646 | A1* | 1/2005 | Chung | G09G 3/00 |
| | | | | 348/E17.005 |
| 2005/0251370 | A1* | 11/2005 | Li | G01R 31/31707 |
| | | | | 702/190 |
| 2006/0148166 | A1* | 7/2006 | Craig | H01L 23/49855 |
| | | | | 257/E21.705 |
| 2006/0218516 | A1* | 9/2006 | McLain | G06F 30/398 |
| | | | | 345/650 |
| 2007/0194254 | A1* | 8/2007 | Hubertus Mulkens | |
| | | | | G03F 7/70091 |
| | | | | 250/504 R |
| 2009/0026169 | A1* | 1/2009 | Cho | H05K 3/4679 |
| | | | | 219/121.6 |
| 2009/0056116 | A1* | 3/2009 | Presley | H01L 21/67167 |
| | | | | 29/791 |
| 2009/0080764 | A1* | 3/2009 | Srinivasan | G06T 7/0004 |
| | | | | 382/150 |
| 2009/0150834 | A1* | 6/2009 | Lingambudi | G06F 30/39 |
| | | | | 716/137 |
| 2009/0178751 | A1* | 7/2009 | Presley | H01L 21/67225 |
| | | | | 156/60 |
| 2009/0326703 | A1* | 12/2009 | Presley | H01L 21/67727 |
| | | | | 700/121 |
| 2010/0122224 | A1* | 5/2010 | Lucas | G03F 1/36 |
| | | | | 716/136 |
| 2011/0138616 | A1* | 6/2011 | Cho | H05K 3/0008 |
| | | | | 29/829 |
| 2013/0097576 | A1* | 4/2013 | Ye | G06F 30/367 |
| | | | | 716/136 |
| 2014/0064445 | A1* | 3/2014 | Adler | G01N 23/04 |
| | | | | 378/43 |
| 2015/0014044 | A1* | 1/2015 | Ao | H05K 3/0005 |
| | | | | 174/266 |
| 2015/0270023 | A1* | 9/2015 | Adler | G01N 23/04 |
| | | | | 378/43 |
| 2016/0351283 | A1* | 12/2016 | Adler | H01L 22/12 |
| 2017/0200524 | A1* | 7/2017 | Adler | G01N 23/083 |
| 2018/0293721 | A1* | 10/2018 | Gupta | G06N 20/00 |
| 2018/0342051 | A1* | 11/2018 | Sezginer | G06T 7/001 |
| 2019/0212281 | A1* | 7/2019 | Shchegrov | G01N 23/2273 |
| 2019/0303522 | A1* | 10/2019 | Green | G06Q 10/063 |
| 2019/0311083 | A1* | 10/2019 | Feng | G03F 1/78 |
| 2019/0370955 | A1* | 12/2019 | Zhang | G06K 9/628 |
| 2020/0356718 | A1* | 11/2020 | Chu | G06N 3/0454 |
| 2021/0014979 | A1* | 1/2021 | Adler | H05K 3/4038 |

OTHER PUBLICATIONS

International Search Report and Written Opinion for International Application No. PCT/US2020/041536, dated Oct. 27, 2020.

* cited by examiner

5400

```
Nondestructively inspect a printed circuit board to measure a
number of dimensions at a number of pre-determined locations of
the printed circuit board
5410
```
↓
```
Generate a model of the printed circuit board based on the
measured dimensions
5420
```
↓
```
Calculate one or more drilling values based on the model of the
printed circuit board
5430
```
↓
```
Provide, to a drilling machine, instructions for drilling a number of
plated-through vias based on the calculated drilling values on the
printed circuit board
5440
```

Generate a first X-ray image of a printed circuit board at a first direction
5510

Identify, from the first X-ray image, a number of plated-through vias of the printed circuit board
5520

Measure one or more dimensions associated with each identified plated-through via based on the first X-ray image
5530

Identify one or more defects associated with one or more identified plated-through vias based on corresponding measured dimensions
5540

*FIG. 5*

METHODS AND SYSTEMS FOR MANUFACTURING PRINTED CIRCUIT BOARD BASED ON X-RAY INSPECTION

PRIORITY

This application claims the benefit under 35 U.S.C. § 119(e) of U.S. Provisional Patent Application No. 62/873752, filed 12 Jul. 2019, which is incorporated herein by reference.

TECHNICAL FIELD

This invention relates to manufacturing PCBs based on X-ray inspection.

BACKGROUND

A printed circuit board (PCB) electrically connects and mechanically supports electrical or electronic components using conductive tracks, pads and other features. A PCB may include one or more sheet layers of non-conductive substrates with conductive material laminated to these substrates. Components could be soldered onto the PCB to electrically connect and mechanically fasten to the PCB. The inspection techniques using optical photons or electrons to inspect silicon wafers cannot be used to inspect PCBs because they do not penetrate through the non-conductive substrates to provide an internal view of the PCBs. Since X-rays can penetrate through many layers of PCBs, X-ray inspections may provide an internal view of the assembled device. A PCB may have a number of plated-through vias (PTVs) which may be drilled by a drilling machine. The drilling process may be affected by a variety of factors that could negatively affect the quality of the PCB.

SUMMARY OF PARTICULAR EMBODIMENTS

Particular embodiments described herein relate to systems and methods for manufacturing printed circuit board (PCBs) based on X-ray inspection. A PCB may include a number of plated-through vias (PTVs) which will be back-drilled by a drilling machine to eliminate the unwanted portions. The X-ray inspection system may nondestructively inspect the PCB to measure one or more dimensions of the PCB at a number of pre-determined locations of the PCB. The X-ray inspection system may generate a data set or a model for the PCB based on the measured PCB dimensions and may calculate customized drilling values (e.g., drilling depths customized to PCB thickness at respective drilling locations) based on the PCB model. The X-ray inspection system may provide instructions to a drilling machine based on the calculated drilling values for the drilling machine to drill the PTVs of the PCB using the customized drilling values. After the PCB has been drilled, the X-ray inspection system may inspect the PCB again to make sure the stub lengths of the back-drilled PTVs are within a pre-determined range and to identify the defective PTVs caused by the back-drilling process (e.g., under-drilled stub lengths, over-drilled stub lengths, misaligned drilling positions, incorrect drilling angles, broken drill heads, incorrect drill head sizes, etc.). For inspecting back-drilled PCB, the system may generate a first X-ray images of a PCB at a first direction. Then, the system may identify a number of PTVs of the PCB from the first X-ray image (e.g., using computer vision algorithms or machine-learning models). The system may measure one or more dimensions associated with each identified PTV based on the first X-ray image. The system may identify defective PTVs based on the PTV dimensions measured based on the first X-ray image. The system may further generate a second X-ray image of the PCB at a second direction and identify the defective PTVs based on a comparison of the first X-ray image captured from the first angle and the second X-ray image captured from the second angle.

The system may measure one or more dimensions associated with the one or more defective PTVs and calculate new drilling values (e.g., new drilling depths, new drilling angle, new drilling positions, new drill head size, etc.) for the defective PTVs based on the determined PTV dimensions. The system may provide, to the drilling machine, new instructions for re-drilling the defective PTVs based on the new drilling values. The PCB manufactured based on the X-ray inspection may include a number of layers with one or more of the layers having a layer thickness varying along one or more dimensions of the PCB. The PCB may include a number of conductive traces each being associated with one of the PCB layers. The PCB may include at least 100 back-drilled PTVs. Each back-drilled PTV may include a conductive central portion connecting at least two conductive traces of two different layers. The back-drilled PTV may include a first stub portion having a first associated conductive trace and being connected to a first end of the conductive central portion. The first stub portion may have a maximum stub length of less than or equal to 6 mil extending from the first associated conductive trace towards a first external surface of the PCB.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter that can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4 illustrates an example method for back-drilling the plated-through via using customized back-drill depths.

FIG. 5 illustrates an example method for inspecting a printed circuit board to identify defects.

Figure 1A:
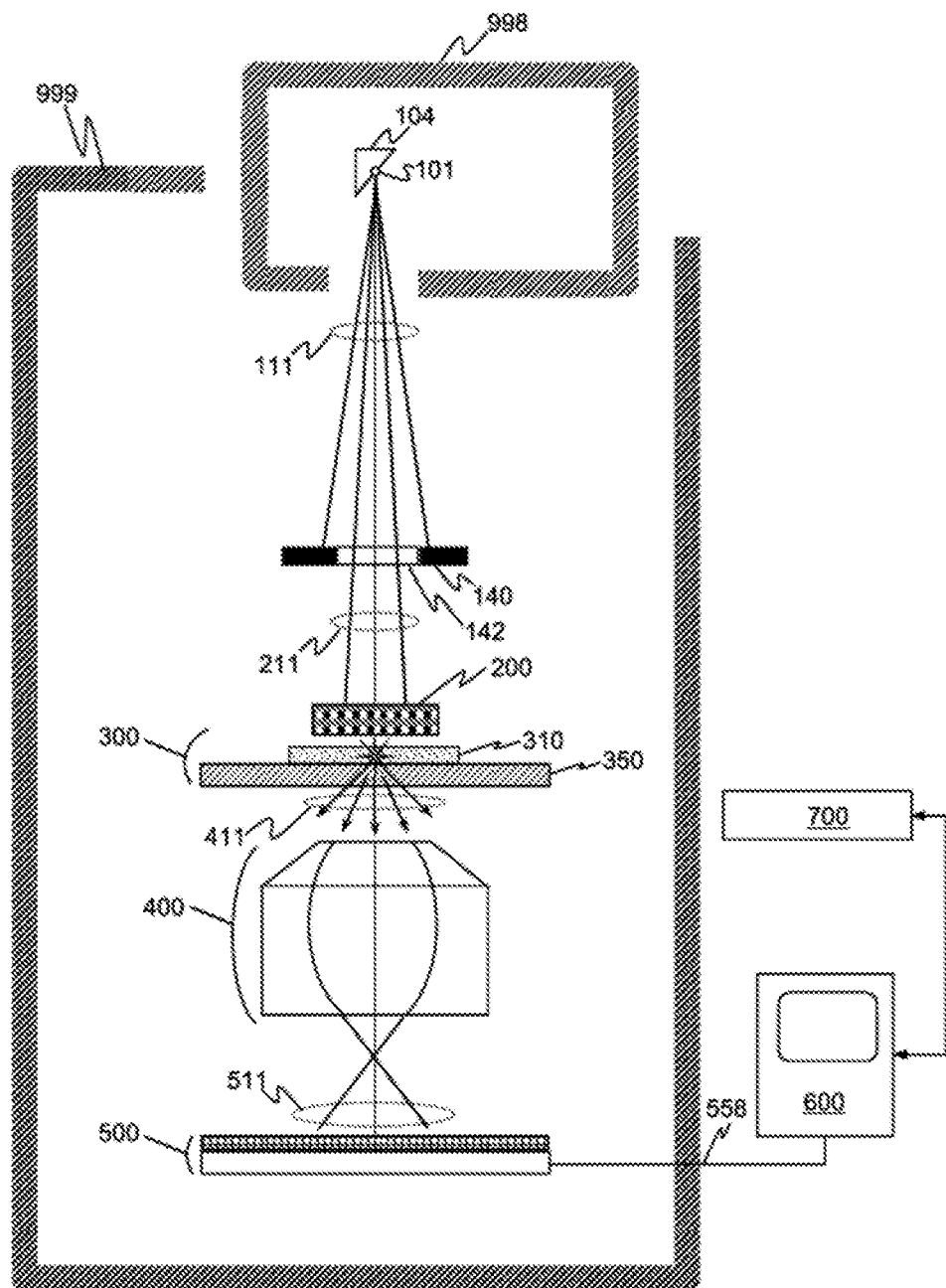
FIG. 1A illustrates an example automatic high-speed X-ray inspection system.

Note: Elements shown in the drawings are meant to illustrate the functioning of the invention and have not been drawn to scale.

DESCRIPTION OF EXAMPLE EMBODIMENTS

Automated High-Speed X-ray Inspection System

X-Ray System Framework

The system and methods disclosed herein are related to a system or the use of a system that illuminates an object to be examined or inspected with X-rays, converts X-rays to visible (or near-visible) photons, forms an image of the visible (or near-visible) photons, and then converts the image into an electronic form. As such, the various embodiments of this X-ray image formation system will be presented first, followed by the various embodiments of methods and systems that utilize the X-ray imaging system.

Although many kinds of objects can be examined or inspected using the apparatus disclosed here, it is expected to be especially suitable for the examination and inspection of integrated circuit wafers and packaging assemblies. One example of these are silicon interposers, comprising silicon with multiple TSVs, but the invention can also be used for the inspection of an integrated circuit (IC) itself, a silicon interposer, a silicon dioxide interposer, a PCB (PCB) with or without ICs already installed, a 3D IC package or assembly, a 2.5D IC package or assembly, a multi-chip module (MCM), a system-in-package (SIP) and other electronic microdevices or portion thereof that comprise microscopic structures. These may be examined as incoming materials, completed products, or as partially manufactured objects at any stage of their manufacture for the purpose of metrology, process control, inspection, or yield management.

Non-electronic devices with micro-or nano-structures, such as magnetic recording media, photonic structures and photonic crystals, metamaterials, etc., can also be examined and inspected using this invention. Capacitive sensors, such as fingerprint sensors, can also be examined. A particularly attractive feature of the apparatus is that it is possible to make non-destructive, high-resolution observations and measurements of features within an object that cannot otherwise be seen using electrons or optical photons, as are used in conventional metrology and inspection tools.

In general, objects suitable for use with this invention will comprise at least one flat side. Examples include: electronic circuits on semiconductor wafers, parts of wafers or selected areas on wafers; integrated circuit chips, dice, assemblies, packages, or portions thereof; micro-fluidic devices; micro-electro-mechanical systems (MEMS), including accelerometers, gyros, magnetic and capacitive sensors and the like; photonic devices, particularly those fabricated using planar waveguides; biological tissues, including stained samples; photomasks or templates for printing or fabricating any of the above mentioned devices; and solar cells, parts thereof or parts pertaining to solar cells. Other objects without flat sides may be observed and inspected as well, but the image quality may not be uniform for objects of irregular dimensions.

In particular embodiments, the X-ray inspection system as described in this disclosure may be a high-speed X-ray inspection system. In particular embodiments, the high-speed X-ray inspection system may have a higher measurement/inspection speed than traditional X-ray systems (e.g., 100 times faster than traditional X-ray systems). As an example and not by way of limitation, the high-speed X-ray inspection system may be capable of inspecting electronic components or devices with an image collection time of approximately 33 milliseconds. In particular embodiments, the X-ray inspection system as described in this disclosure may be an automated X-ray inspection system. In particular embodiments, the automated X-ray inspection system may include one or more computers or controllers and instructions stored in one or more computer media. The automated measurement process of the automated X-ray inspection system may be controlled by the computers or controllers by executing corresponding instructions. The automated measurement process of the automated X-ray inspection system may not need interventions from human operators and may be automatically performed following particular procedures.

In particular embodiments, the X-ray inspection system as described in this disclosure may use one more artificial intelligence (AI) modules and/or machine-learning models. In particular embodiments, the artificial intelligence (AI) modules may be or include any suitable methods, processes, and/or algorithm performed by one or more computing systems. In particular embodiments, the machine-learning models may be or include, for example, but are not limited to, a rule-based algorithm, a random forest model, a neutral network or any suitable machine-learning models. In particular embodiments, the X-ray inspection system as described in this disclosure may perform real-time measurements to one or more processes performed by another system (e.g., a drilling machine, a bonding tool, an assembling tool, or any suitable tools). In particular embodiments, the term "real-time measurements" may refer to measurements performed by the X-ray inspection system in parallel to an associated process (e.g., a drilling process, an assembling process, a bonding process, or any suitable processes) without slowing down the associated process. The X-ray inspection system may perform measurements and provide feedback to the systems performing the associated process in a speed higher than or equal to the speed of the associated process.

In particular embodiments, the X-ray inspection system as described in this disclosure may perform in situ and/or inline measurements with one or more other systems or tools (e.g., a drilling machine, a bonding tool, an assembling tool, or any suitable tools). In particular embodiments, the term "in situ measurements" may refer to measurements performed by the X-ray inspection system which is integrated with other systems. For example, the X-ray inspection system may be integrated into a drilling machine and perform in situ measurements to monitor the drilling process of the drilling machine. The in situ measurements may be automatically controlled by one or more computing systems coordinating the X-ray inspection system and the drilling machine. In particular embodiments, the term "inline measurements" may refer to measurements performed by the X-ray inspection system within the same process (e.g., a drilling process, an assembling process, a bonding process, or any suitable processes) performed by another system (e.g., a drilling machine, a bonding tool, an assembling tool, or any suitable tools). For example, during an assembling process performed by an assembling tool, the X-ray system may inspect the assembled components or devices during one or more steps of the assembling process. The components or devices may be automatically transferred from the assembling tool to the X-ray inspection system (e.g., by a robot arm) or may be manually transferred from the assembling tool to the X-ray inspection system (e.g., by a human operator). The X-ray inspection system may provide feedback information automatically to the assembling tool or to a human operator.

X-ray Imaging System

FIG. 1A illustrates an example automatic high-speed X-ray inspection system 1000A. An X-ray emitter 101 emits X-rays 111. These X-rays are then shaped into a collimated X-ray beam 211, in some embodiments using distance from the emitter 101 and a plate 140 with an aperture 142. This collimated X-ray beam 211 then illuminates an object 200 to be examined. The X-rays that are transmitted through the object 200 illuminate a scintillator assembly 300 comprising a scintillator 310 and, in some embodiments, a support 350 for the scintillator. The scintillator 310 absorbs a portion of the X-rays and releases some of the energy so absorbed with the emission of visible photons 411.

Using an optical system 400, a magnified image 511 of the visible photons 411 emitted by the scintillator is formed on an image detector 500. The image detector 500 converts the intensity of the magnified image 511 to an electronic signal. The image detector 500 can comprise an electronic sensor, such as a charge-coupled device (CCD), or another image sensor known to those skilled in the art. The electronic signal is transmitted to a system of electronics 600 that, in some embodiments can display the image results, and in some embodiments can store the image results and/or perform image processing algorithms on the image results in conjunction with a computer system 700.

For any source emitting ionizing radiation such as X-rays, it is often wise to provide shielding 998 around the X-ray source 100, and in some situations legally required for operation. Such shielding 998 can be a simple enclosure of shaped sheets of lead metal, or a more intricate design fabricated from any of a number of X-ray absorbing materials, such as lead-doped glass or plastic, that will be known to those skilled in the art. Shielding is desirable to keep random X-rays, either directly from the emitter 101 or reflected from some other surface, from causing unwanted effects, particularly spurious signals in the various electronic components used to control the system.

Likewise, for some embodiments, additional shielding 999 around the beam path may also be desired, and in some cases be legally required for operation. Such additional shielding 999 can be a simple enclosure of shaped sheets of lead metal, or a more intricate design fabricated from any of a number of X-ray absorbing materials such as lead-doped glass or plastic, that will be known to those skilled in the art. Additional shielding 999 is desirable to keep random X-rays, either directly from the emitter 101 or reflected from some other surface, from causing unwanted effects, particularly spurious signals in the various electronic components used to control the system.

Because certain image detectors 500 such as those comprising CCD sensors can be particularly sensitive to X-ray exposure, in some embodiments a portion of the scintillator assembly 300 can also be fabricated in whole or in part using a material, such as a lead-doped glass, which absorbs X-rays while transmitting the visible photons 411 emitted by the scintillator.

Figure 1B:
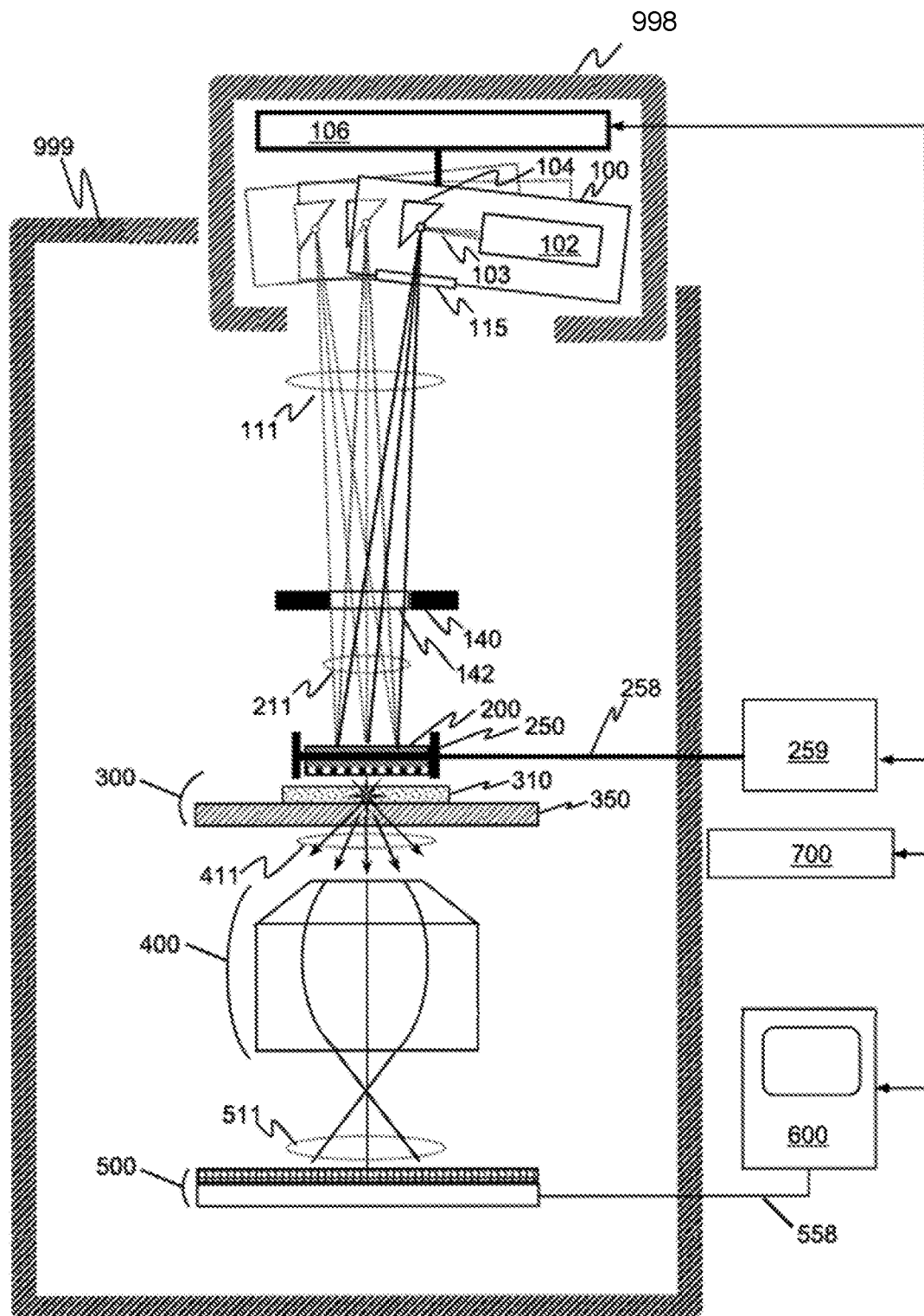
FIG. 1B illustrates an example X-ray inspection system with movable X-ray source with respect to the inspected object for generating X-ray images at different directions.

FIG. 1B illustrates an example X-ray inspection system 1000B with movable X-ray source with respect to the inspected object for generating X-ray images at different directions. As an example and not by way of limitation, the X-ray system may include a mount 106 that can move the position of the X-ray source 100 relative to the object 200, thereby changing the angle of incidence of the X-ray beam on the object. The mount 106 can be designed to allow the X-ray source 100 to swing in the x-z plane, in the y-z plane, or any other combination of axes. The source can also be moved along the z-axis to move the X-ray source 100 closer to the object 200. This may have the effect of making the beam brighter, increasing signal strength, at the cost of having an X-ray beam that is less collimated, reducing resolution. This effect may be reduced or eliminated by reducing the spot size of the X-ray source.

Motion of the X-ray source 100 using the mount 106 can be controlled by the computer system 700 several ways. In some embodiments, the source mount 106 may move the X-ray source 100 to a fixed location to allow an image to be captured. In some embodiments, the mount 106 can move the X-ray source 100 continuously as images are gathered, allowing the dynamic change of X-ray intensity as transmitted through the object 200 to be recorded as a function of illumination angle. In some embodiments, the X-ray emitter 101 can be moved to at least 10 degrees off the normal incidence angle. In some embodiments, further adjustment of the angle of incidence of the X-ray beam 211 on the object 200 can be achieved by coordinating the motion of the X-ray source 100 using the source mount 106 with the motion of the object 200 using the object mount 250. This coordination can be done manually or using the computer system 700. In some embodiments, the shielding 998 will be designed to enclose the X-ray source 100 and the source mount 106. In other embodiments, the shielding 998 can be designed to only enclose the X-ray source, with the mount 106 designed to move the shielding 998 as it moves the X-ray source 100. In some embodiments of the invention, multiple X-ray sources may be used to produce images with different angles of incidence. The X-ray sources may be fixed in space or moveable and may be operated sequentially or simultaneously. They can be operated manually or controlled by one or more computer systems 700.

In particular embodiments, the X-ray imaging system described in this disclosure may be an automated high-speed and high-resolution X-ray imaging system for generating X-ray images of electronic devices. In particular embodiments, the automated high-speed X-ray inspection system may include X-ray detectors with a high sensitivity for X-ray radiation, a very large number of grayscale levels (e.g., 10,000+ grayscale levels) with a large dynamic range, and a large number of pixels (e.g., greater than 29 megapixels) for generating high resolution images. In particular embodiments, the system may have a spatial resolution of lower than 2 nm, a field of view of 12 mm×12 mm, and a throughput greater than 3000 mm$^2$ per minute. More details about the X-ray system may be found in U.S. patent application Ser. No. 15/470726, filed 27 Mar. 2017, which is incorporated herein by reference.

Overview

Stub Length and Bit Rate

In particular embodiments, a PCB may have a number of layers, a number of conductive traces, and a number of plated-through vias (PTVs). Each layer of the PCB may have a substrate layer made of dielectric materials. Different layers of the PCB may be laminated together. Each conductive trace may be associated with a layer of the PCB. Each plated-through via (PTV) may connect at least two conductive traces of different layers. The plated-through vias (PTVs) may be referred to as plated-through holes (PTHs). Each PTV may have one or more stub portions which may extend from the associated conductive traces to the external surfaces of the PCB. The stub portion may be an open end not connected to other conductive traces except the associated conductive trace which is connected to the stub portion through a central portion. The stub portions may cause insertion loss to the transmitted signals and may unintentionally radiate signals to the surrounding space. The stub portions may cause resonance (e.g., ringing) or unacceptable noise limiting the maximum frequency or a data rate along a conductive trace. The maximum stub length may determine the performance characteristics of the PCB such as the bandwidth, the signal speed, or the data rate. In general, a shorter maximum stub length may allow the PCB to have a greater bandwidth or a higher data rate by avoiding or overcome the signal insertion loss or other technical problems such as unintended radiation. A PCB may have a bus composed of a number of conductive traces and numerous stubs and vias. The maximum stub length of back-drilled plated-through vias (PTVs) of a PCB may be correlated to the data rate (e.g., bit rate) of the PCB in the following manner:

| Bit Rate (Gbit/S) | Maximum Stub Length (mils) |
|---|---|
| 8 | 62 |
| 16 | 31 |
| 32 | 16 |
| 64 | 8 |
| 128 | 4 |
| 256 | 2 |

As an example and not by way of limitation, a maximum stub length of 8 mil (i.e., 0.008 inches) may be corresponding to a data rate of 64 Gbit/s; a maximum stub length of 4 mil (i.e., 0.004 inches) may be corresponding to a data rate of 128 Gbit/s; and a maximum stub length of 2 mil (i.e., 0.002 inches) may be corresponding to a data rate of 256 Gbit/s. In particular embodiments, the PTVs of the PCB may be back-drilled to reduce the length of the stubs to increase the bandwidth, the signal speed, or the data rate of the PCB.

Problems Being Solved

A PCB may include a number of plated-through vias (PTVs) which need to be back-drilled using a drilling machine. However, existing back-drilling techniques have several disadvantages that can negatively affect the quality of the PCBs manufactured using these back-drilling techniques. For example, the existing back-drilling techniques may use a coupon, which is cut from a corner or from other portions of the PCB that are not used for other purposes to test and practice drilling. After being drilled, the coupon may be sent to lab for cross-section measurement. Then, the drilling depth may be calculated based on the cross-section data of the coupon and may be used for drilling the whole PCB. The calculated drilling depth values may be calculated by subtracting a safety threshold value from a target drilling depth for voiding over-drilling. As a result, the drilling depth are calculated based on the layer thickness information of the coupon instead of the portions of the PCB where the PTV will be drilled. However, a PCB may have multiple layers with different layer thickness and the layer thickness of each layer may vary along one or more dimensions of the PCB. Consequently, the different portions of the PCB may have different board thickness and layer thickness of each layer. Applying the same drilling depth values calculated based on the coupon cross-section data to the whole PCB will lead to large variation in the resulting drilling depth. The safety threshold value, which is subtracted from the target drilling values to void over-drilling, will lead to less actual drilling depths and longer back-drilled stubs, and therefore negatively affect the PCB products manufactured using these techniques. Furthermore, the cross-section measurement of the coupon can take 1 hour to 12 hours in general. The drilling machine, on which the PCB is amounted, is in idle state while waiting for the cross-section data. The utilization of the drilling equipment is very low (e.g., about 50%) for half of the time being spent on waiting for cross-section results. This is a huge waste on the manufacturing resource and dramatically slows down the manufacture process of the PCB. In addition, the coupon cross-section measurement is a destructive measurement to the PCB by cutting the coupon from the PCB. The capability of coupon cross-section measurement method is very limited because of the limited places on the PCB that can be used as coupons.

Some other existing back-drilling techniques may use a beep-test method to measure the drill depth during the drilling process. During the drilling process, the drill head may cut through the conductive traces layer by layer and create open circuit for the conductive traces being cut through. The beep-test method may measure the conductivity from the drill head to the conductive traces in different layers to indicate the current drilling depth. The beep-test method cannot reliably detect the drilling depth of the drill head and is not capable of detecting the drilling depth when the drill head is between two layers of the conductive traces. Some other existing back-drilling techniques may cut out a conical part from the PCB and may use an optical microscope to inspect the copper rings to measure the layer height from the slope geometry. This destructive method can only be used on the very limited unused areas the PCB and may damage the plating of plated-through via (PTV) and the conductive traces of the PCB. This method is not capable of measuring the layer thickness for the whole PCB. Some other existing back-drilling techniques may use a timedomain reflectometer method to measure the stub lengths by sending electrical signals through a conductive wire and measuring the reflected signals. However, this method cannot accurately measure the stub lengths, and as a result, the quality of the manufactured PCBs cannot be stabilized.

Solution Summary

In particular embodiments, before drilling a PCB, the X-ray inspection system may nondestructively inspect the PCB to measure one or more dimensions of the PCB at a number of pre-determined locations of the PCB. The X-ray inspection system may generate a model for the PCB based on the measured PCB dimensions and may calculate customized drilling values (e.g., drilling depths customized to PCB thickness at respective drilling locations) based on the PCB model. The X-ray inspection system may provide instructions to a drilling machine based on the calculated drilling values. The drilling machine may drill the PTVs of the PCB using the customized drilling values. After the PCB has been drilled, the X-ray inspection system may inspect the PCB again to make sure the stub lengths of the back-drilled PTVs are within a pre-determined range and to identify any defective PTVs caused by the back-drilling process (e.g., under-drilled stub lengths, over-drilled stub lengths, misaligned drilling positions, incorrect drilling angles, broken drill heads, incorrect drill head sizes, etc.). For inspecting back-drilled PCB, the system may generate a first X-ray images of a PCB at a first direction. Then, the system may identify a number of PTVs of the PCB from the first X-ray image (e.g., using computer vision algorithms or machine-learning models). The system may measure one or more dimensions associated with each identified PTV based on the first X-ray image. The system may identify defective PTVs based on the PTV dimensions measured based on the first X-ray image. The system may further generate a second X-ray image of the PCB at a second direction and identify the defective PTVs based on a comparison of the first X-ray image captured from the first angle and the second X-ray image captured from the second angle. The system may measure one or more dimensions associated with the one or more defective PTVs and calculate new drilling values (e.g., new drilling depths, new drilling angle, new drilling positions, new drill head types or sizes, etc.) for the defective PTVs based on the measured PTV dimensions. The system may provide, to the drilling machine, new instructions for re-drilling the defective PTVs based on the new drilling values. The PCB manufactured based on the X-ray inspection may include a number of layers with one or more of the layers having a layer thickness varying along one or more dimensions of the PCB. The PCB may include a number of conductive traces each being associated with one of the PCB layers. The PCB may include at least 100 back-drilled PTVs. Each back-drilled PTV may include a conductive central portion connecting at least two conductive traces of two different layers. The back-drilled PTV may include a first stub portion having a first associated conductive trace and being connected to a first end of the conductive central portion. The first stub portion may have a maximum stub length of less than or equal to 6 mil extending from the first associated conductive trace towards a first external surface of the PCB.

Benefits and Advantages

In particular embodiments, the PCBs manufactured using the back-drilling techniques as described in this disclosure may have higher signal speed limit or data rate by having shorter stub lengths than the PCBs processed by previously existing back-drilling techniques. In particular embodiments, the PCBs manufactured using the back-drilling techniques as described in this disclosure may have smaller impedance variation over the board by having smaller variation in stub lengths. In particular embodiments, the PCBs manufactured using the back-drilling techniques as described in this disclosure may have less insertion loss and less insertion loss variation for the plated-through vias (PTVs) over the board by having shorter stub lengths and smaller variation in stub lengths. In particular embodiments, the PCBs manufactured using the back-drilling techniques as described in this disclosure may have a lower defect rate (e.g., by monitoring variations and making adjustment before the variations cause defect). In particular embodiments, the PCBs manufactured using the back-drilling techniques as described in this disclosure may be manufactured at a faster speed than the previously existing techniques by using inline inspection rather than destructive coupon cross-section testing. In particular embodiments, the PCBs manufactured using the back-drilling techniques as described in this disclosure may be manufactured at a faster speed by eliminating the time-consuming "trial-and-error" in the previous techniques and eliminating the machine idle time for waiting cross-section results.

In the particular embodiments, the X-ray inspection system may feed inspection data to current manufacturing facilities in current configuration without substantial changes to manufacturing processes. In particular embodiments, the X-ray inspection system may be integrated to current manufacturing facilities and may be used with the current streamline manufacturing process and current equipment to increase utilization of streamline manufacturing tool. In particular embodiments, the X-ray inspection system may improve drilling precision on existing drilling tools with no needs for new hardware. In particular embodiments, the cost related to X-ray inspection may be less than 5% of the cost of the PCB. In particular embodiment, the same X-ray inspection system may be used for both customizing the back-drilling process and inspecting the PCB for quality control purpose, providing a cost-effective solution for manufacturing PCBs. In particular embodiments, the X-ray inspection system may have lower distortion, less noise, and better signal-to-noise ratio (SNR). In particular embodiments, the PCBs with high precision stub length may allow the server card to be updated one at a time in a cost-effective manner without replacing the whole backplane. The above discussed advantages are for exemplary purpose only and the advantages are not limited thereof. The advantages may include other advantages. Each of the advantages may be for a specific embodiment and is not required in all embodiments. A specific embodiment may include any of the advantages or none of the advantages.

PTVs and Back-Drilling Process

PTV Stub Portion Influence a. PCB and PTV Structures

Figures 2A, 2B:
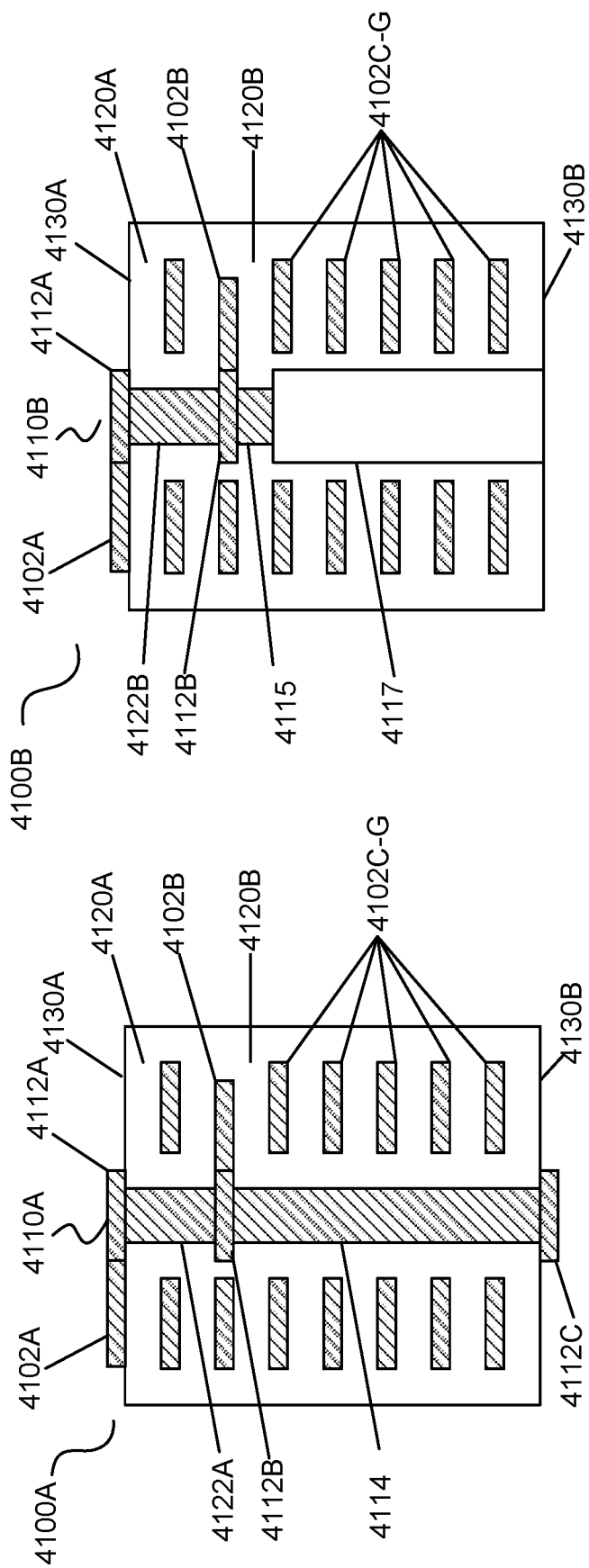
FIG. 2A illustrates an example plated-through via of a printed circuit board.
FIG. 2B illustrates an example plated-through via processed using a back-drilling process by a drilling machine.

FIG. 2A illustrates an example plated-through via 4110A of a printed circuit board 4100A. The PCB 4100A may have a number of layers (e.g., 4120A, 4120B) and a number of conductive traces (e.g., 4102A, 4102B). Each conductive trace may be associated with a layer of the PCB 4100A. Each layer of the PCB 4100A may include a dielectric substrate. In particular embodiments, the conductive traces may be laminated to the associated layers and different layers of the PCB may be laminated together. The PCB 4100A may have a number of plated-through vias (PTVs). In this particular example, the plated-through via (PTV) 4110A may have a conductive central portion 4122A and a stub portion 4114. The conductive central portion 4122A may also be called a barrel or a conductive tube portion. The conductive central portion 4122A may connect at least two conductive traces of different layers. The conductive central portion 4122A may have a number of conductive pads. The conductive central portion 4122A may have a first conductive pad 4110A at the first end of the conductive central portion 4122A and a second conductive pad 4112B at the second end of the conductive central portion 4122A. The conductive central portion 4122A may be connected to a first conductive trace 4102A through the first conductive pad 4110A and connected to a second conductive trace 4102B through the second conductive pad 4112B. The conductive central portion 4122A and the stub portion 4114 of the plated-through via 4110A may be made of conductive materials including, for example, but not limited to copper, silver, or any suitable conductive materials. In some embodiments, the plated-through via (PTV) 4110A may have a conductive pad for each layer of the PCB. The conductive central portion 4122A and the stub portion 4114 may have a hollow core (not shown) formed by the conductive plating of the conductive central portion 4122A and the stub portion 4114. The hollow core (not shown) may be in a cylinder shape with the axis aligned to the axis of the plated-through via (PTV) 4110A. In particular embodiments, the hollow core may be an air core. In particular embodiments, the hollow core may be filled with dielectric materials. The plated-through via (PTV) illustrated in FIG. 2A is for example purpose only and the PCB is not limited thereto.

b. Stub Coupling with Other Portions

In FIG. 2A, the conductive central portion 4122A of the plated-through via (PTV) 4110A may connect the first conductive trace 4102A of the first layer to the second conductive trace 4102B of the third layer of the PCB 4100A. All other conductive traces of other layers may not need be connected to the conductive central portion 4122A or the stub portion 4114 of the plated-through via (PTV) 4110A. Although the conductive central portion 4122A and the stub portion 4114 of the plated-through via (PTV) 4110A are not connected to the conductive traces of other layers, the stub portion 4114 of the plated-through via (PTV) 4110A may extend from the associated conductive trace 4102B into the space of other layers containing the other conductive traces (e.g., 4102C-G). The stub portion 4114 and other conductive traces (e.g., 4102C-G) may be capacitively coupled, inductively coupled, or both capacitively and inductively coupled. The capacitive or inductive coupling may generate unintended cross-influence between the stub portion 4114 and the conductive traces of different layers and may limit the performance of the PCB 4110A. The conductive traces themselves may be capacitively coupled, inductively coupled, or both capacitively and inductively coupled to each other. The conductive traces of different layers may have cross-talk between each other. One exemplary limitation on the performance of the PCB may be a reduced bandwidth, a reduced data rate, or a reduced signal speed limit.

c. Signal Insertion Loss

In particular embodiments, insertion loss may be defined as the loss of signal power resulting from the insertion of a device or component in a transmission line. Insertion loss may be expressed in decibels (dB). If the power transmitted to the load before insertion is $P_T$ and the power received by the load after insertion is $P_R$, then the insertion loss (IL) in dB may be calculated by $$IL(\text{dB}) = 10\log_{10}\frac{P_T}{P_R}.$$

In particular embodiments, the stub portion 4114 may include a conductive pad 4112C at the end of the stub portion. In particular embodiments, the stub portion 4114 may include a tube-shape portion of the stub portion 4114 with a certain length without the conductive pad at the end. In particular embodiments, the stub portion 4114 may include multiple conductive pads in different layers of the PCB 4100A. The stub portion 4114 of the plated-through via (PTV) 4110A may provide additional signal paths for the signal transmitted between the conductive trace 4102A of the first layer and the conductive trace 4102B of the third layer. These additional signal paths may create an insertion loss between the two connected conductive traces of 4102A and 4102B. As an example and not by way of limitation, the signal transmitted from the conductive trace 4102A may transmit through the conductive central portion 4122A reaching to the end of the stub portion 4114 at the bottom surface of the PCB 4100A. Then, the signal may be reflected back and transmit to the conductive trace 4102B of the third substrate layer 4120B of the PCB 4110A. The additional signal paths may include multiple signal paths containing the reflected signals. In particular embodiments, the insertion loss may be characterized by a notch in the frequency response curve. In particular embodiments, the insertion loss may be at the level of, for example, but not limited to −80 dB to −90 dB in the frequency of 12 GHz to 14 GHz. In particular embodiments, the stub portion 4114 may have a resonant frequency and may resonate electrically at the resonant frequency. The example insertion loss values and the signal frequency herein are for example purpose only and are not limited thereto.

d. Radiation to Surrounding Space

Furthermore, the stub portion 4114 may serve as an unintended antenna radiating signals to the materials and the space containing the stub portion 4114. The unintended radiation may cause further insertion loss in addition to the reflected signal paths. The radiation may influence the performance of other conductive traces unintentionally. Both the reflected signal paths and the unintended signal radiation may vary with the frequency of the transmitted signals and limit the signal speed limit or data rate of the PCB. The inappropriate stub length may be a prohibitive factor for the PCB to operate at high signal speeds or high data rates. In particular embodiments, the PCB may be processed by a back-drilling process to reduce the length of the stub and to increase the signal speed limit or data rate of the PCB.

Back-Drilled PTV a. Back-Drilling Process

FIG. 2B illustrates an example plated-through via (PTV) 4110B processed using a back-drilling process by a drilling machine (not shown). In particular embodiments, the drilling machine (not shown) may drill on the PCB 4100B at the location of the plated-through via (PTV) 4110B. The plated-through via (PTV) 4110B may include a central portion 4122B which is connected to the conductive trace 4102A through the conductive pad 4112A and is connected to the conductive trace 4102B through the conductive pad 4112B. In particular embodiments, the drilling direction may be perpendicular to an external surface 4130B of the PCB 4100B and parallel to the axis of the plated-through via (PTV) 4110B. In particular embodiments, the drilling process may start from a back-end of the plated-through via (PTV) 4110B corresponding to the portion that is not connected to any conductive trace. During the back-drilling process, the drilling machine may align the axis of the drill head with the axis of the plated-through via (PTV) 4110B so that the drill head and the plated-through via (PTV) 4110B are co-centered. The drilling machine may drill from the external surface 4130B toward the inner layers of the PCB 4100B. The back-drilling process may remove at least a portion of the conductive plating corresponding to the stub portion that is not connected to any other conductive traces. In particular embodiments, the back-drill process may create a back-drilled portion 4117 surrounded by the layer material and forming a cylinder shape. The plated-through via (PTV) illustrated in FIG. 2B is for example purpose only and the PCB is not limited thereto.

b. Over-Drilling and Its Influence

The length of the back-drilled stub portion 4115 may be a factor limiting the signal speed limit or data rate of the PCB 4100B. In general, a PCB having shorter back-drilled stubs may have a higher limit for the signal speed or data rate than the PCB having longer back-drilled stubs. Therefore, the back-drilled stub should be as short as possible to achieve a high signal speed or data rate for the PCB. However, when trying to produce the shorter back-drilled stub and voiding an "open" circuit on trace, the drilling machine is risking for over-drilling the plated-through via (PTV) 4110B. Many factors may lead to the over-drilled plated-through via (PTV). In particular embodiments, the factors include, for example, but are not limited to, variation of layer thickness of the PCB, precision of target drilling depths, etc. While the PCB may have multiple layers, each of the layers may have different layer thickness. The thickness of each layer may vary along one or more dimensions of the PCB. In general, the PCB having greater layer thickness and more layers may have greater variations in the layer thicknesses. An over-drilled plated-through via (not shown) may have damages in one or more of the conductive pads connecting the conductive traces of different layers and may render the whole PCB to be non-functional. The previously existing back-drilling techniques are lack of means to measure or monitor the layer thickness of the PCB at the locations of the plated-through vias (PTVs). Therefore, the previously existing back-drilling techniques may use drilling depth which is equal to the ideal drilling depth subtracting a threshold value to avoid over-drilling. The resulting back-drilled plated-through vias (PTVs) processed by the previously existing back-drilling techniques may have long back-drilled stubs which limit the highest signal speed or data rate of the PCB.

c. Stub Length Variations

Furthermore, the back-drilled stubs produced by the previously existing back-drilling techniques may have large variations and low precisions in length. Because the layer thickness of the PCB may vary along one or more dimensions, the same drilling depth value used by the drilling machine may lead to different back-drilled stub length at different locations. The back-drilled stubs may have variations in length corresponding to the variations of the layer thickness. The previously existing drilling techniques cannot precisely control the stub length because each location or each layer may have different layer thickness. The variation of the stub length may be at the same level to the variations of the layer thickness or may be greater than the variation of the layer thickness because of the accumulative effect of the multiple layers. Therefore, the back drilled stubs generated by the previously existing back-drilling techniques may have long stubs and large variations in the stub length which will lead to insertion loss variations and impedance variations across the PCB. The impedance variation over the PCB may be another prohibitive factor for the PCB to operate at high signal speeds or data rates. The impedance variation over the PCB may lead to different signal speed limits at different locations of the PCB. A certain high frequency signal may work on one portion of the PCB may fail at other portions of the same PCB. The limit of the signal speed or data rate of the whole PCB may be determined by the lowest speed limit at all the locations across the PCB.

Under-Drilled Stub Length

Figures 2C, 2D:
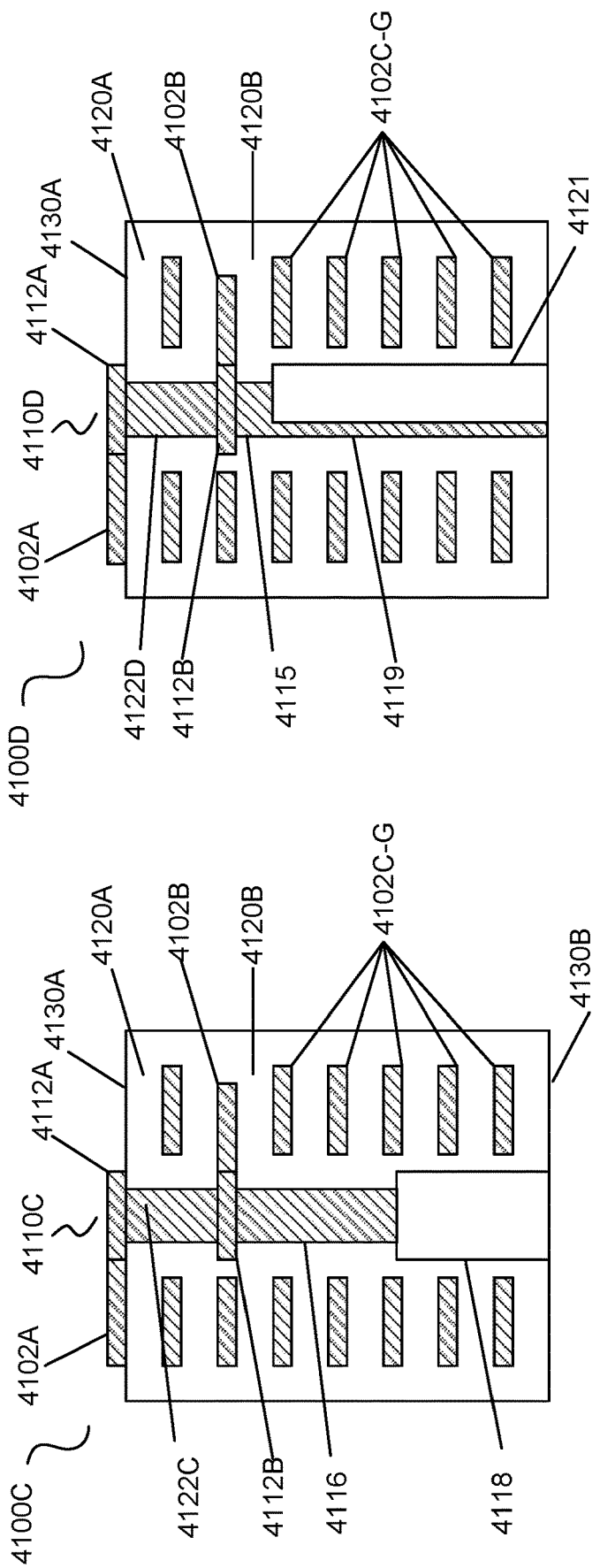
FIG. 2C illustrates an example back-drilled plated-through via which has an under-drilled defect.
FIG. 2D illustrates an example back-drilled plated-through via which has a conductive sleeve caused by misalignment of the back-drill process.

FIG. 2C illustrates an example back-drilled plated-through via (PTV) 4110C which has an under-drilled defect. The plated-through via (PTV) 4110C may include a central portion 4122C which is connected to the conductive trace 4102A through the conductive pad 4112A and is connected to the conductive trace 4102B through the conductive pad 4112B. For under-drilled plated-through via, the stub 4116 may have a stub length that is longer than the target stub length. The back-drilled portion 4118 may have a drill depth less than the target drilling depth. Similar to the prior-drilling stub portion, the under-drilled stub 4116 may cause an insertion loss between the connected conductive traces of different layers and may have unintended radiation to the surrounding materials and space containing the under-drilled stub 4116. Consequently, the under-drilled stub 4116 may limit the highest signal speed or data rate of the PCB 4100C. The back-drilled plated-through via (PTV) illustrated in FIG. 2C is for example purpose only and the PCB is not limited thereto.

Misaligned Drilling Position

FIG. 2D illustrates an example back-drilled plated-through via (PTV) 4110D which has a conductive sleeve 4119 caused by misalignment of the back-drill process. The plated-through via (PTV) 4110D may include a central portion 4122D which is connected to the conductive trace 4102A through the conductive pad 4112A and is connected to the conductive trace 4102B through the conductive pad 4112B. When the drilling machine aligns the drill head axis to the plated-through via, the drill head may be misaligned. The misaligned drilling process may create an off-centered back-drilled portion 4121. The misaligned drilling process may leave a thin sliver of conductive material forming a conductive sleeve 4119 in the plated-through via 4110D. Similar to the prior-drilling stub and the under-drilled stub, the conductive sleeve 4119 may cause an insertion loss between the connected conductive traces of different layers and may have unintended radiation to the surrounding materials and space containing the conductive sleeve 4119. Consequently, the conductive sleeve 4119 may limit the highest signal speed or data rate of the PCB 4100D. The back-drilled plated-through via (PTV) illustrated in FIG. 2D is for example purpose only and the PCB is not limited thereto.

PTV with Two Stub Portions

Figure 2E:
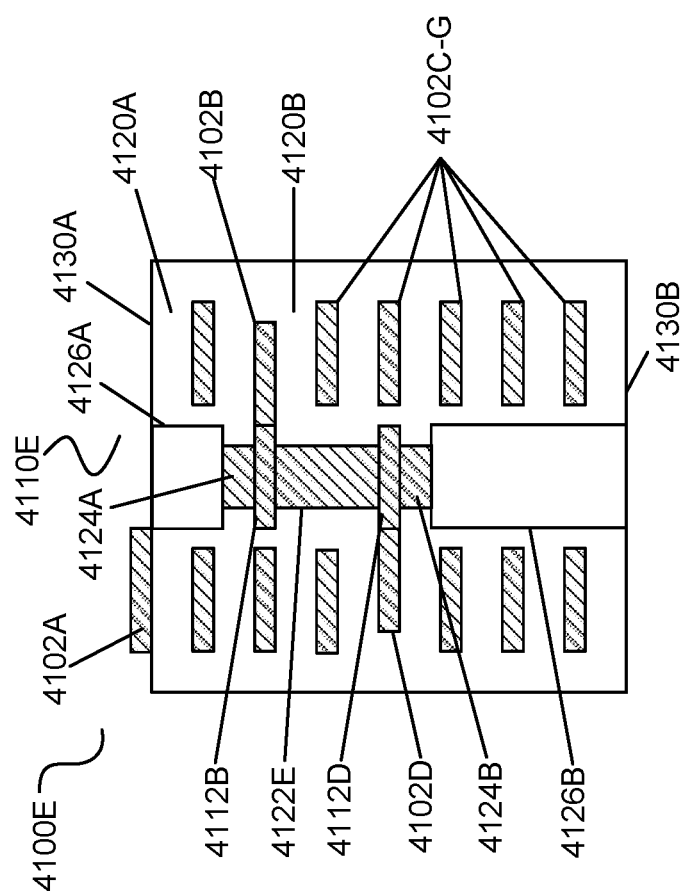
FIG. 2E illustrates an example back-drilled plated-through via which has two stub portions.

FIG. 2E illustrated an example back-drilled plated-through via (PTV) 4110E having two stub portions (e.g., 4124A and 4124B). In particular embodiments, the back-drilled plated through via (PTV) 4110E may have a first stub portion 4124A and a second stub portion 4124B. The PCB 4100E may have a first external surface 4130A and a second external surface 4130B. In particular embodiments, the first external surface 4130A and the second external surface 4130B of the PCB may be parallel to each other. In particular embodiments, the back-drilled plated-through via (PTV) 4110E may have a conductive central portion 4122E which may have a first conductive pad 4112B and a second conductive pad 4122D connected to different conductive traces of different layers. The conductive central portion 4122E may be connected to the conductive trace 4102B through the first conductive pad 4112B and connected to the conductive trace 4102D through the second conductive pad 4112D. The back-drilled plated-through via (PTV) 4110E may have a first stub portion 4124A connecting to the first end of the conductive central portion 4122E and a second stub portion 4124B connecting to the second end of the conductive central portion 4122E. The first stub portion 4124A may be associated with the conductive trace 4102B and the second stub portion 4124B may be associated with the conductive trace 4102D. The first stub portion 4124A may extend from the associated conductive trace 4102B to the first external surface 4130A of the PCB 4100E. The second stub portion 4124B may extend from the associated conductive trace 4102D to the second external surface 4130B of the PCB 4100E. The back-drilled plated-through via (PTV) 4110E may have a first back-drilled portion 4126A adjacent to the first stub portion 4124A and a second back-drilled portion 4126B adjacent to the second stub portion 4124B. The back-drilled plated-through via and the related features illustrated in FIG. 2E are for example purpose only and the PCB is not limited thereto. FIGS. 2A-2E are for example purpose only and are not drawn to scale.

PVT Stub Length and Precision

In particular embodiments, referring to FIG. 2B, each back-drilled plated-through via (PTV) of the PCB that are back-drilled based on X-ray inspection as described in this disclosure may have a conductive central portion (e.g., 4122B), a stub portion (e.g., 4115), and a back-drilled portion (e.g., 4117). The conductive central portion may have two conductive pads at each end of the conductive central portion. The conductive central portion may connect at least two conductive traces of two different layers through the conductive pads. In particular embodiments, the stub portion (e.g., 4115 in FIG. 2B) may have a maximum stub length of less than or equal to 6 mil with a stub length precision within ±2 mil. In particular embodiments, the stub portion (e.g., 4115 in FIG. 2B) may extend from the associated conductive trace towards a first external surface of the PCB. In particular embodiments, the back-drilled portion may be adjacent to the stub portion. In particular embodiments, the back-drilled portions may have back-drilled depths corresponding to layer thickness variations in a portion of the PCB containing the back-drilled plated-through via (PTV).

In particular embodiments, referring to FIG. 2E, a back-drilled plated-through via may have a second stub portion (e.g., 4124A) and a second back-drilled portion (e.g., 4126A). In particular embodiments, the second stub portion (e.g., 4124A) may be connected to a second end of the conductive central portion (e.g., 4122E). In particular embodiments, the second back-drilled portion (e.g., 4126A) may be adjacent to the second stub portion (e.g., 4124A). In particular embodiment, the second stub portion (e.g., 4124A) may have a maximum stub length of less than or equal to 6 mil with a stub length precision within ±2 mil. In particular embodiments, the second stub portion (e.g., 4124A) may extend from the associated conductive trace towards a second external surface of the PCB. In particular embodiments, the second back-drilled portions (e.g., 4126A) may have second back-drilled depths corresponding to layer thickness variations in a portion of the PCB containing the back-drilled plated-through via (PTV). In particular embodiments, the drilling machine may drill the plated-through via (PTV) starting from the first or second end of the plated-through via (PTV) and along the axis of the plated-through via (PTV). In particular embodiments, the back-drill process of the drilling machine may drill the plated-through via (PTV) in a direction from the first end toward the second end of the plated-through via (PTV). In particular embodiments, the back-drill process of the drilling machine may drill the plate-through via (PTV) in a direction from the second end toward the first end of the plated-through via (PTV). In particular embodiments, the back-drill process of the drilling machine may drill in both of a first direction from the first end toward the second end of the plated-through via (PTV) and a second direction from the second end toward the first end of the plated-through via (PTV). In particular embodiments, the first and second stub portions may have a maximum stub length of less than or equal to 6 mil with a stub length precision within ±2 mil. In particular embodiments, the first and second stub portions may have a maximum stub length of less than or equal to 6 mil with a stub length precision within ±1 mil. The first back-drilled portion 4126A and the second back-drilled portion 4126B have back-drilled depths which are corresponding to layer thickness variations in a portion of the PCB 4100E containing the back-drilled plated-through via 4110E.

Manufacturing PCB Based on X-ray Inspection

PCB with Varying Thickness

In particular embodiments, the PCB may have one or more layers, a number of conductive traces, and a number of back-drilled plate-through vias (PTVs). In particular embodiments, the layers of the PCB may include a variety of dielectric materials. The dielectric materials may be, for example, but are not limited to, epoxy, woven glass, non-woven glass, matte glass, Teflon, phenolic cotton paper, cotton paper, matte glass, polyester, gluing materials, or a combination of any suitable materials. The layers of the PCB may be laminated together by applying pressure and heat on the PCB for a period of time. The lamination process may cause the epoxy material to have different thickness along one or more dimensions of the PCB. In particular embodiments, the one or more layers may have a layer thickness varying along one or more dimensions of the PCB typically caused by the interstitial thickness of the epoxy material. In particular embodiments, the layer thickness variation may be caused by the thickness variation of the gluing materials. In particular embodiment, the layer thickness of the PCB may have a variation up to ±10% with respect to the layer thickness. As an example and not by way of limitation, a PCB layer having a layer thickness of 100 mil may have a layer thickness variation up to ±10 mil. As another example and not by way of limitation, a PCB layer having a layer thickness of 50 mil may have a layer thickness variation up to ±5 mil.

PTVs with Varying Stub Lengths

Figure 3A:
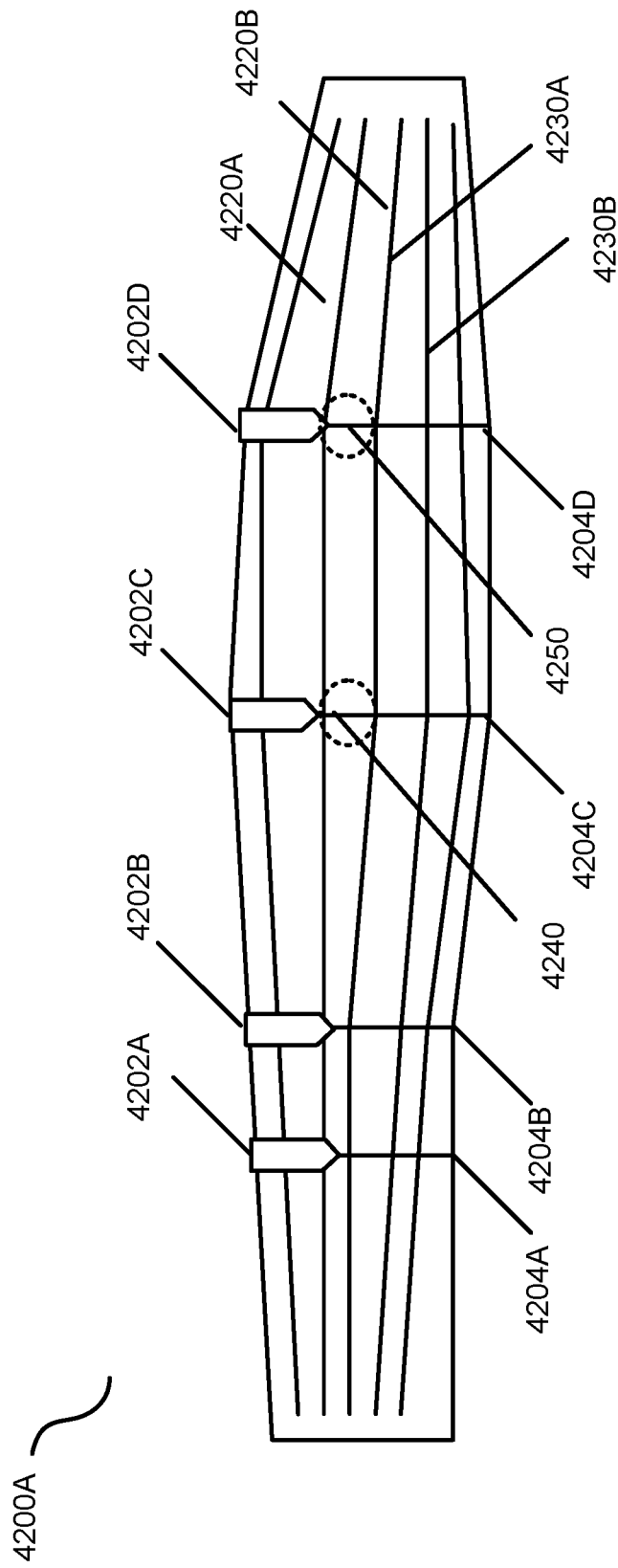
FIG. 3A illustrates an example printed circuit board which has varying layer thickness and is backed-drilled using the same back-drill depth from printed circuit board surface.

FIG. 3A illustrates an example of printed circuit board 4200A processed by the previous back-drilling techniques. In this example, the PCB 4200A may have 6 layers. Each of the layers may have different layer thickness and the thickness of each layer may vary along one or more dimensions of the PCB. For example, the layers 4220A and 4220B have different layer thickness and the layer thickness of each of the layers 4220A and 4220B varies at least along the lateral direction. The distance of the conductive traces of different layers may also vary along one or more dimensions of the PCB. For example, the conductive traces 4230A and the conductive traces 4230B may have a distance varying at least along the lateral direction of the PCB. The PCB 4200A may include a number of plated-through vias (PTVs) (e.g., 4204A, 4204B, 4204C, and 4204D) which are back-drilled using the same drilling depth. The back-drilled portions of 4202A, 4202B, 4202C, and 4202D may have the same depth corresponding to the drilling depth. The plated-through via (PTV) of 4204C may have a long stub 4240 and the plated-through via 4204D may have a long stub 4250. The long stubs of 4240 and 4250 may be caused by using the same drilling depth at different locations of the 4204C and 4204D where the layer thickness and board thickness are different. The long stubs of 4240 and 4250 may limit the signal speed limit or data rate of the PCB. The PCB illustrated in FIG. 3A is for example purpose only and the PCB is not limited thereto. FIG. 3A is for illustrating purpose only and the dimensions (e.g., layer thickness, variation of the layer thickness) are not drawn to scale.

Pre-Mapping PCB at Pre-Determined Locations

In particular embodiments, prior to being drilled by the drilling machine, the X-ray inspection system may inspect the PCB to measure a number of dimensions (e.g., thickness) of the PCB at a number of pre-determined locations on the PCB. In particular embodiments, the pre-determined locations for the measurement may be determined based on the design of the PCB to optimize the measurement accuracy and reduce the time of the measurement process. The X-ray inspection system may access the design file of the PCB to determine the locations that need to be measured. As an example and not by way of limitation, the PCB may include a number of areas each corresponding to a chip to be amounted to the PCB. The system may inspect the location corresponding to these areas each corresponding to a future chip. As another example and not by way of limitation, the PCB may include a number of areas each including a number of plated-through vias PTVs. The system may inspect the PCB at these areas each including a number of plated-through vias (PTVs). As another example and not by way of limitation, the X-ray inspection system may inspect a first portion of the PCB with a higher location density because this first portion has more thickness variation and may inspect a second portion with a lower location density because this second portion has less thickness variation (e.g., smaller thickness variation over the same distance). As another example and not by way of limitation, the X-ray inspection system may inspect each location corresponding to each plated-through via (PTV). As another example and not by way of limitation, the system may select a number of representative locations based on the PCB design and measure the PCB dimensions at these representative locations. In particular embodiments, the pre-determined locations for the dimension measurement may include the locations different from the locations of the plated-through vias (PTVs). In particular embodiments, the pre-determined locations may include an array of locations cross the PCB with uniform or non-uniform location intervals (e.g., one measurement location per 6 inches×3 inches area).

PCB Dimension Parameters Measured based on X-ray Inspection

In particular embodiments, the measured PCB dimensions by the X-ray inspection may include, for example, but are not limited to, a layer thickness of each layer of the PCB, a distance between any two layers of the PCB layers, a trace width and a trace thickness of each conductive trace, a distance between any two conducive traces, a drilling position, a drilling depth, a drilling angle, a back-drilled stub length, a thickness of a substrate, a distance between any two features of a number of features of the PCB, etc. In particular embodiments, the features may include one or more of: a layer of the PCB, a conductive trace, a plated-through via, a back-drilled stub, a die, a component, an interconnect, etc. In particular embodiments, the distance parameter measured based on the X-ray inspection may be a vertical distance, a lateral distance, or a distance in three-dimensional space.

PCB Model and Virtual Cross Section

In particular embodiments, the X-ray inspection tool may generate a 3D model of the PCB based on the measured dimensions through the X-ray inspections. In particular embodiments, the 3D model may include dimension data for the pre-determined locations of the PCB where the dimension parameters are measured. In particular embodiments, the 3D model may include dimension data for locations beyond the pre-determined locations of the PCB. The dimension data for the locations beyond the pre-determined locations may be calculated based on the measured dimensions and a set of rules for modeling the PCB (e.g., interpolation). In particular embodiments, the set of rules for modeling the PCB may be input by users and stored in a modeling rule database. In particular embodiments, the set of rules for modeling the PCB may be based on the experiential knowledge and modeling theories in related fields. In particular embodiments, the 3D model may be used to generate a virtual cross section the PCB. The virtual cross section may correspond to any cross section of the PCB. The virtual cross section may correspond to a drilling position corresponding to a PTV location of the PCB. The virtual cross section of the PCB may correspond to any position in the X and Y dimensions of the PCB. The virtual cross section of the PCB may correspond to any view angle in the X, Y, and Z dimensions of the PCB. In particular embodiments, the 3D model and the virtual cross sections may cover 100% of the PCB.

Calculate Customized Drilling Values

In particular embodiments, the X-ray inspection tool may calculate one or more drilling values based on the 3D model of the PCB. In particular embodiments, the X-ray inspection tool may generate one or more virtual cross sections corresponding to the drilling positions on the PCB based on the 3D model. The X-ray inspection tool may calculate the drilling values which are customized based on the virtual cross section data corresponding to the specific drilling positions. In particular embodiments, the drilling values may include, for example, but are not limited to: drilling depth values, drilling position coordinates, drilling angles, lengths of drill heads, diameters of drill heads, types of drill heads, etc. As an example and not by way of limitation, the X-ray inspection system may calculate a customized drilling depth for each plated-through via (PTV) based on the layer thickness information of the PCB at that particular location. For the same target stub length, the X-ray inspection system may determine a greater customized drilling depth for a first location at a thicker portion of the PCB than a second location at a thinner portion of the PCB. The customized drilling depth may allow the result stub length to be more accurate and precise regardless the thickness variation of PCB layers.

ML and AI Algorithm

In particular embodiments, the X-ray inspection system may include an artificial intelligence (AI) module or/and a machine learning (ML) algorithm. In particular embodiments, the artificial intelligence (AI) module and the machine learning (ML) algorithm may be implemented on a computing device associated with the X-ray inspection system , or a computing device associated with the drilling machine, or a separate computing device associated with the X-ray inspection system. In particular embodiments, the artificial intelligence (AI) module and the machine learning (ML) algorithm may work during a pre-mapping process before the drilling process or in real-time during the drilling process. In particular embodiments, the X-ray inspection system may capture a number of X-ray images of the PCB and measure PCB dimensions based on the captured X-ray images. In particular embodiments, the X-ray inspection system may analyze the 3D model of the PCB using the artificial intelligence (AI) module or/and the machine learning (ML) algorithm. In particular embodiments, the X-ray inspection system may identify the plated-through vias (PTVs) and determine corresponding drilling values using the artificial intelligence (AI) module or/and the machine learning (ML) algorithm. In particular embodiments, the drilling machine may receive the calculated drilling values determined by the artificial intelligence (AI) module or/and the machine learning (ML) algorithm. In particular embodiments, the drilling machine may drill on the plated-through vias (PTVs) based on the received drilling values determined by the artificial intelligence (AI) module or/and the machine learning (ML) algorithm. In particular embodiments, the artificial intelligence (AI) module or/and the machine learning (ML) algorithm may provide deep-learning to measure stub lengths with a high precision, for example, a precision of ±1 mil. In particular embodiments, the X-ray inspection system may be automated setup from ODB++ files. The ODB files and Gerber files may contain information related to PCB layouts, information related to placement of different features in a layer, and the stack-up information of multiple layers.

Drill PTVs Using Customized Drilling Depth

In particular embodiments, the X-ray inspection system may provide instructions with customized drilling values (e.g., drilling depths and drilling angles) to a drilling machine to cause the drilling machine to drill the plated-through vias (PTVs) of the PCB using the calculated drilling values. In particular embodiments, the calculated drilling values may be based on the 3D model data including layer thickness information for the specific drilling positions. The calculated drilling values may be customized based at least on the layer thickness information of the specific locations. In particular embodiments, the X-ray inspection system may generate a drilling file including a number of calculated drilling values for a specific PCB, a specific PCB design, or a specific lot of the PCBs. In particular embodiments, the drilling machine may drill PTVs in a board by board basis, or design by design basis, or lot by lot basis using the drilling file including the calculated driving values. In particular embodiments, the drilling values may be calculated in a board by board basis, or design by design basis, or lot by lot basis.

PCB with Customized Drilling Depths

Figure 3B:
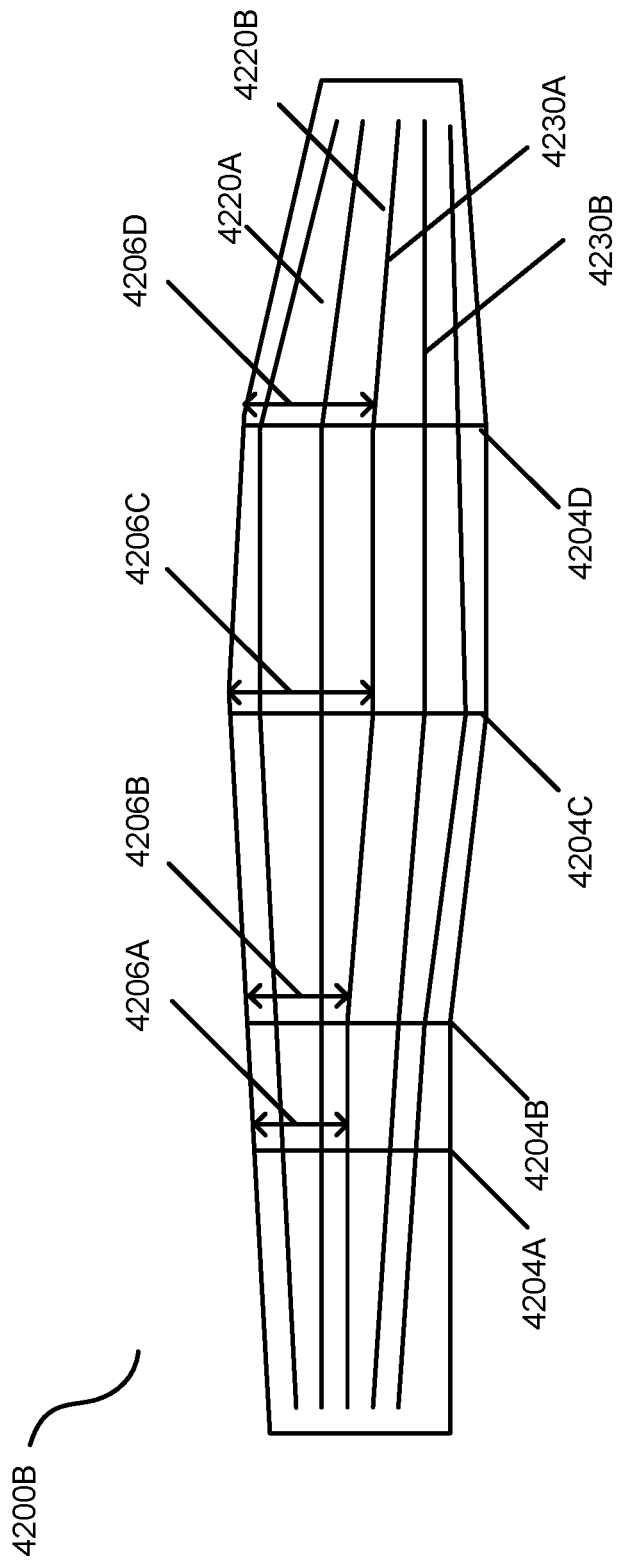
FIG. 3B illustrates an example printed circuit board having the layer thickness measured by the automated high-speed X-ray inspection system.

FIG. 3B illustrates an example printed circuit board 4200B having the layer thickness measured by the automated high-speed X-ray tool. The layer thickness of each layer may be measured at the specific locations of the plated-through vias (PTVs) of 4204A, 4204B, 4204C, and 4204D. The customized drilling depth of 4206A, 4206B, 4206C, and 4206D may be calculated for the plated-through vias of 4204A, 4204B, 4204C, and 4204D, respectively. In this particular example, the drilling depth may correspond to the top three layers from top surface of the PCB. The customized drill depth may be based on the layer thickness of each layer at that specific location. Each of the plate-through vias (PTVs) may have different drilling depth customized to the layer thickness at that specific location. For example, the drilling depth 4206C for the plated-through via (PTV) 4204C may be greater than the drilling depth 4206B for the plated-through via (PTV) 4204B because of the layer thickness is greater at the location of the plated-through via (PTV) 4204C. The PCB, the drilling depth, the layer thickness variation, the layer thickness, the number of layers, and other related parameters illustrated in FIG. 3B are for example purpose only and the PCB is not limited thereto.

Figure 3C:
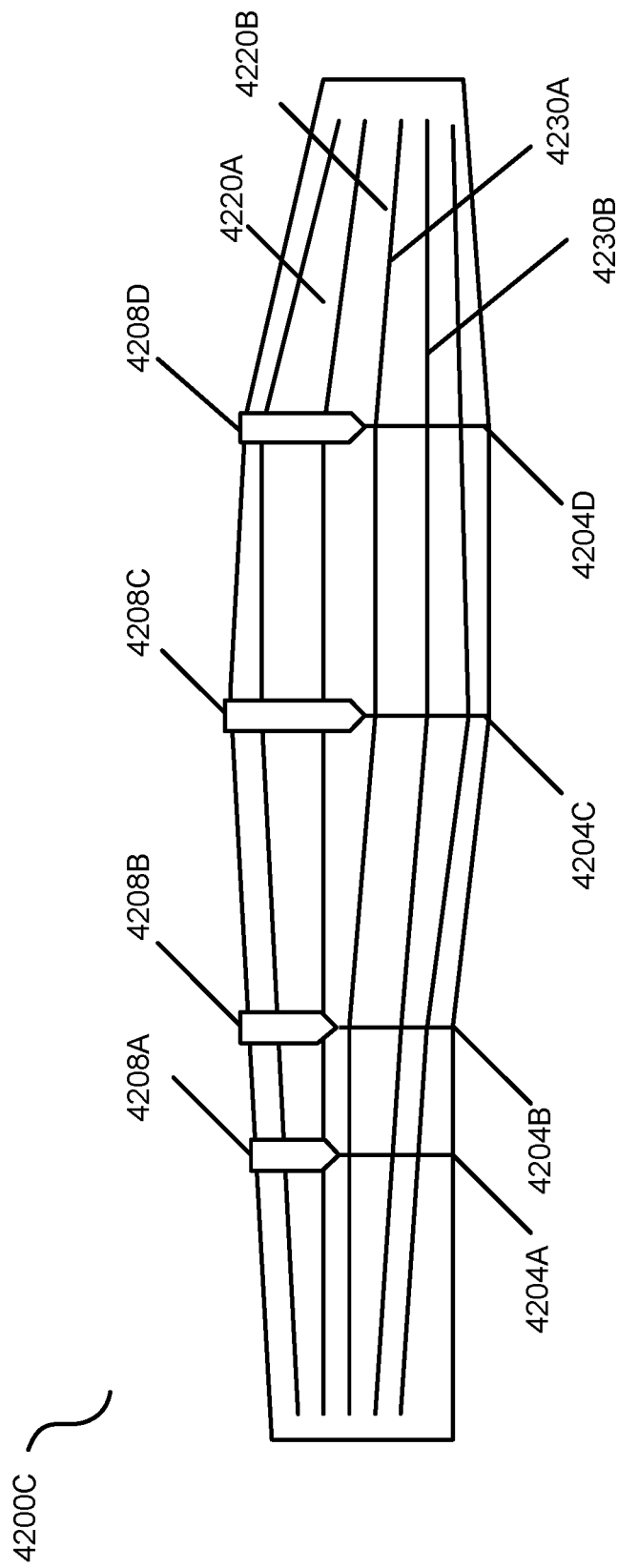
FIG. 3C illustrates an example printed circuit board back-drilled using the customized back-drill depths.

FIG. 3C illustrates an example printed-circuit board 4200C back-drilled using the customized drilling depths. The drilling machine may drill each plated-through via (PTV) using a corresponding drilling depth value customized to that specific location of the plated-through via (PTV). As a result, the plated-through vias (PTVs) of 4204A, 4204B, 4204C, and 4204D may have short and uniform back-drilled stub length. The back-drilled holes of 4208A, 4208B, 4208C, and 4208D may have different depths corresponding to the customized drill depths at respective locations. The PCB, the drilling depth, the layer thickness variation, the layer thickness, the number of layers, and other related parameters illustrated in FIG. 3C are for example purpose only and the PCB is not limited thereto.

Figure 3D:
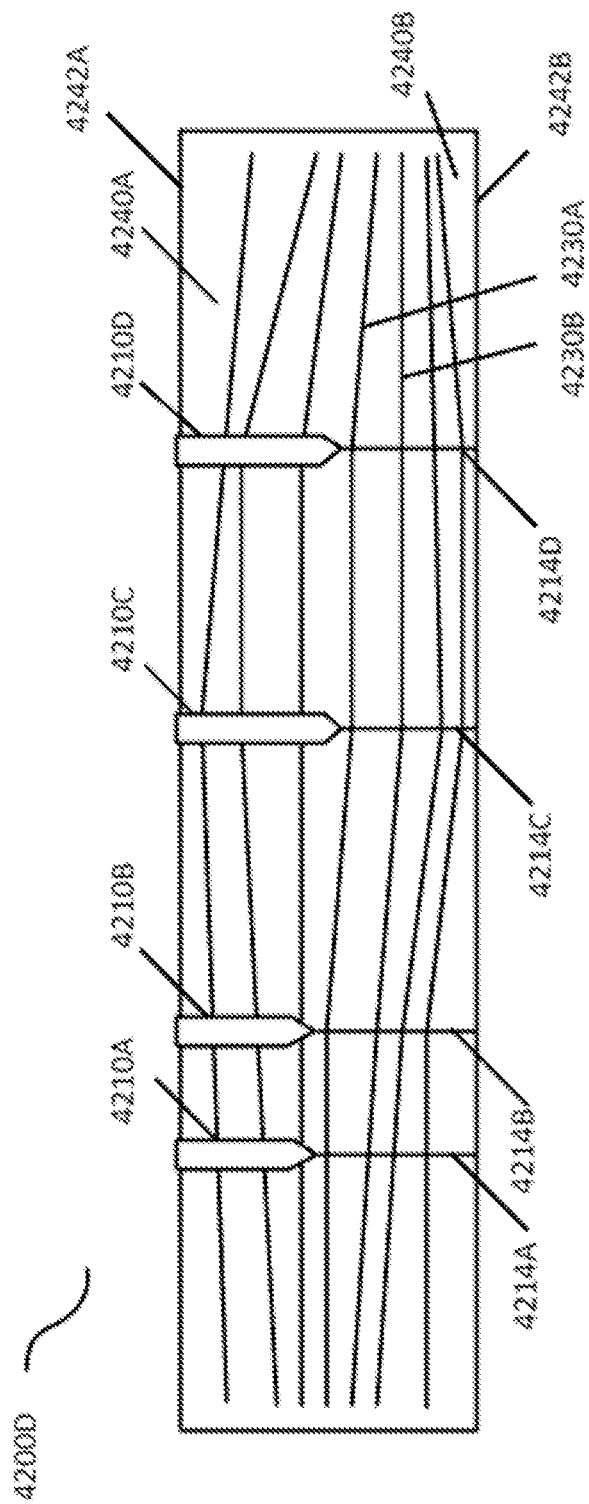
FIG. 3D illustrates an example printed circuit board which has parallel external surfaces and varying layer thickness and is back-drilled using customized back-drill depths.

FIG. 3D illustrates an example PCB 4200D which has parallel external surfaces and varying layer thickness and is back-drilled using customized back-drill depths. In this particular embodiment, the PCB 4200D may have two external surfaces 4242A and 4242B which are parallel to each other. The drilling machine may drill each plated-through via (PTV) using a corresponding drilling depth customized to that specific location of the plated-through via (PTV). As a result, the plated-through vias (PTVs) of 4214A, 4214B, 4214C, and 4214D may have a maximum stub length of less than or equal to 6 mil and a stub length precision within ±2 mil. The back-drilled portions of 4210A, 4210B, 4210C, and 4210D may have different back-drill depth corresponding to the customized drill depths at respective locations. The PCB, the drilling depth, the layer thickness variation, the layer thickness, the layers, and other related parameters illustrated in FIG. 3D are for example purpose only and the PCB is not limited thereto.

Example Method for Pre-Mapping PCB and Drill PCB with Customized Drilling Values FIG. 4 illustrated an example method 5400 for back-drilling the plated-through via using customized back-drill depths. The method may begin at step 5410, the X-ray inspection system may nondestructively inspect a PCB to measure a number of dimensions, for example, the layer thickness of the PCB. In particular embodiments, the X-ray inspection system may image or inspect the PCB to measure a number of dimensions or features for generating feedforward information to the back-drilling process. The inspections may be at a number of pre-determined locations on the PCB. The pre-determined locations may or may not include the back-drilling positions. In step 5420, the X-ray inspection system may generate a data set or model for the PCB based on the measured dimensions or features at the pre-determined locations. The PCB model may be a 3D model covering the whole PCB. In step 5430, the X-ray inspection system may calculate the drilling values based on the generated model of the PCB. In step 5440, the system may provide, to a drilling machine, instructions and the calculated drilling value for drilling a number of plated-through vias of the PCB based on the calculated drilling values. The drilling machine, after receiving the instructions and the calculated drilling values may drill the plated-through vias (PTVs) of the PCB using the calculated drilling values. The steps 5430 and 5440 can be repeated until all plated-through vias (PTVs) of the PCB have been drilled.

In particular embodiments, the back-drilled plated-through vias that are drilled using the systems, methods, processes, or principles as described in this disclosure may have the maximum stub length of less than or equal to 6 mil. In particular embodiments, the one or more drilling values may be customized based on one or more localized parameters of the printed circuit board at respective drilling locations. In particular embodiments, the one or more drilling values comprise one or more of: a drilling depth, a drilling position, a drilling angle, a drilling speed, a drill head length, a drill head diameter, or a drill head type. In particular embodiments, the X-ray inspection system may inspect a number of plated-through vias (PTVs) of the printed circuit board (e.g., a percentage of all PTVs or all PTVs) of a PCB. The X-ray inspection system may identify one or more defects associated with one or more plated-through vias of the PCB. In particular embodiments, the one or more defects may include one or more of: an under-drilled stub, an over-drilled plated-through via, a misaligned drilling position, a drilling error, a stub sleeve, a broken drill, a layer delamination, a warpage, a layer misalignment, or a sintering defect. In particular embodiments, the system may classify (e.g., using a classification algorithm, a machine-learning model, or an artificial intelligent module) to classify the detected defects into a number of defect categories (e.g., based on defect types, stub lengths, stub precision, etc.).

In particular embodiments, the X-ray inspection system may measure a stub length of a plated-through via and determine whether the stub length of the plated-through via is with a pre-determined range. In particular embodiments, the X-ray inspection system may determine one or more dimensions or features associated with the one or more plated-through vias that are associated with the one or more defects. The X-ray inspection system may calculate one or more new drilling values for the one or more plated-through vias based on the determined one or more dimensions or features. The system may provide, to the drilling machine, new instructions for re-drilling the one or more plated-through vias that are associated with the one or more defects based on the new drilling values. In particular embodiments, the one or more defects may include one or more of: a misaligned drilling location, an under-drilled plated-through via, a first defect caused by an incorrect drilling angle, a second defect caused a broken drill head, or a conductive sleeve. In particular embodiments, the back-drilled plated-through vias may have a maximum stub length of less than or equal to 6 mil. In particular embodiments, the printed circuit board may a defect rate of less than or equal to 1 part per thousand. In particular embodiments, the back-drilled plated-through vias that are manufactured using the systems, methods, processes, or principles as described in this disclosure may have a defect rate of 1 part per billion to 1 part per thousand based on the X-ray inspection by the X-ray inspection system. As an example and not by way of limitation, the defect rate may be less than or equal to approximately 1 part per thousand, 1 part per 10 thousand, 1 part per 100 thousand, 1 part per million, 1 part per 10 million, 1 part per 100 million, or 1 part per billion. In particular embodiments, the back-drilled plated-through vias may have the maximum stub length of less than or equal to 4 mil and a stub length precision within ±1 mil. In particular embodiments, the back-drilled plated-through vias have the maximum stub length of 2 mil to 6 mil and a stub length precision within ±1 mil.

Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for back-drilling the plated-through via using customized back-drill depths including the particular steps of the method of FIG. 4, this disclosure contemplates any suitable method for back-drilling the plated-through via using customized back-drill depths including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Inspect PCB to Identify Defects

In particular embodiments, the X-ray inspection system may be used for pre-mapping the PCB to measure PCB dimensions for customizing the back-drilling process. In particular embodiments, the same X-ray inspection system may be used for inspecting the PCB before and after the back-drilling process for quality control purpose. There are significant advantages for using the same X-ray inspection system for both of the customized drilling process and the quality control inspection. For example, the product quality and the manufacturing speed of PCBs may be dramatically improved with minimum additional cost for the manufacturing facilities and processes. In particular embodiments, the X-ray inspection system may be used to detect, in a non-destructive manner, a number of defects of the PCB. In particular embodiments, the defects may include, for example, but are not limited to, an under-drilled stub, an over-drilled stub, a drilling error, a stub sleeve, a misalignment, a broken drill head, a layer delamination, a warpage, a layer misalignment, a sintering defect, etc. In particular embodiments, the defects may be caused by a number of factors including one or more of, for example, but not limited to, inaccurate or incorrect drilling values, software problems, broken drill heads, drill head stuck, etc. In particular embodiments, the X-ray inspection system may be used for via clearing after laser drill, via filling before sintering, via filling after sintering, flip drill accuracy measurement, layer-to-layer registration, etc.

FIG. 5 illustrated an example method 5500 for inspecting a printed circuit board to identify defects. The method may begin at step 5510, where the X-ray inspection system may generate a first X-ray image of a printed circuit board at a first direction. At step 5520, the X-ray inspection system may identify, from the first X-ray image, a number of plated-through vias of the printed circuit board (e.g., using computer vision algorithms or machine-learning models). At step 5530, the X-ray inspection system may measure one or more dimensions or features associated with each identified plated-through via based on the first X-ray image. At step 5540, the X-ray inspection system may identify one or more defects associated with one or more identified plated-through vias based on corresponding measured dimensions or features.

In particular embodiments, the X-ray inspection system may classify, using a classification algorithm, the one or more defects into respective defect categories (e.g., based on defect types, stub lengths, stub precisions, etc.). In particular embodiments, the X-ray inspection system may generate a second X-ray image of the printed circuit board at a second direction and identify one or more defects associated with one or more plated-through vias based on a comparison of the first X-ray image and the second X-ray image. In particular embodiments, the X-ray inspection system may calculate one or more drilling values based on the identified defects associated with the one or more plated-through vias. The X-ray inspection system may provide, to a drilling machine, instructions and new drilling values for re-drilling the one or more plated-through vias based on the calculated drilling values on the printed circuit board. The drilling machine, after receiving the instructions and new drilling values, may re-drill the defective plated-through vias (PTVs) based on the new drilling values. The defective plated-through vias (PTVs), after being re-drilled with new drilling values, may eliminate corresponding defects and meet the quality criteria. In particular embodiments, the new drilling values for re-drilling and fixing the defective plated-through vias (PTVs) may include, for example, but are not limited to, a new drilling position, a new drilling depth, a new drilling angle, a new drill head, a new dill head type, a new drill head size, etc. In particular embodiments, the defects that can be fixed by the re-drilling process may include, for example, but are not limited to, an under-drilled stub length, a conductive sleeve, defects caused by a broken or worn drill head, an incorrect or inaccurate drilling position, an incorrect or inaccurate drilling angle, etc.

Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for inspecting a printed circuit board to identify defects including the particular steps of the method of FIG. 5, this disclosure contemplates any suitable method for inspecting a printed circuit board to identify defects including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

PCB Products

Back-Drill Precision

In particular embodiments, the back-drilled plated-through vias (PTVs) that are back-drilled based on X-ray inspection as described in this disclosure may have stub lengths with a high precision. In particular embodiments, the stub length precision may be described by the stub length values, by the stub length variation or deviation with respect to the target stub length, by the stub length deviation with respect to other stub lengths, by the stub length deviation with respect to an average of multiple stub lengths, by the maximum length deviation from the target length, by a variance which is the square of the standard deviation of the stub lengths of all stubs of the PCB, etc. In particular embodiments, the back-drill precision within ±2 mil. In particular embodiments, the back-drilled stubs may have a stub length precision within ±2 mil and a maximum stub length of less than or equal to 6 mil. In particular embodiments, the back-drilled stubs may have a target length of 4 mil and the stub lengths are in the range of 4 mil±2 mil. In particular embodiments, the back-drilled plated vias (PTVs) may have the back-drill precision within ±1 mil. In particular embodiments, the back-drilled stubs may have a stub length precision within ±1 mil and a maximum stub length of less than or equal to 4 mil. In particular embodiments, the back-drilled stubs may have a target length of 3 mil and the stub lengths may be in the range of 3 mil±1 mil. In particular embodiments, the back-drilled stubs may have a stub length precision within ±1 mil and a maximum stub length of $L_{max}$, wherein the $L_{max}$ may be between 2 mil and 6 mil, inclusive. In particular embodiments, the back-drilled stubs may have a target length of $L_t$, wherein the $L_t$ may in the range of 1 mil to 5 mil and the stub lengths may be in the range of $L_t$±1 mil. The short back-drilled stubs may allow the PCB to operate at a high signal speed or data rate. For example, a maximum stub length of 6 mil may allow the PCB to operate at a data rate of 56 Gbit/s. A maximum stub length of 4 mil may allow the PCB to operate at a data rate of 112 Gbit/s. A maximum stub length of 2 mil may allow the PCB to operate at a data rate of 256 Gbit/s.

In particular embodiments, a PCB manufactured using the systems, methods, processes, or principles as described in this disclosure may have at least 100 back-drilled plated-through vias which have the maximum stub length of less than or equal to 6 mil with a stub length precision within ±2 mil. In particular embodiments, a PCB manufactured using the systems, methods, processes, or principles as described in this disclosure may have at least 1000 back-drilled plated-through vias which have the maximum stub length of less than or equal to 6 mil with a stub length precision within ±2 mil. In particular embodiments, a PCB manufactured using the systems, methods, processes, or principles as described in this disclosure may have at least 10,000 back-drilled plated-through vias which have the maximum stub length of less than or equal to 6 mil with a stub length precision within ±2 mil. In particular embodiments, a PCB manufactured using the systems, methods, processes, or principles as described in this disclosure may have at least 100 back-drilled plated-through vias which have the maximum stub length of less than or equal to 6 mil with a stub length precision within ±1 mil.

In particular embodiments, a PCB manufactured using the systems, methods, processes, or principles as described in this disclosure may have at least 100 back-drilled plated-through vias which have the maximum stub length of less than 7 mil with a stub length precision within ±2 mil. In particular embodiments, a PCB manufactured using the systems, methods, processes, or principles as described in this disclosure may have at least 1000 back-drilled plated-through vias which have the maximum stub length of less than 7 mil with a stub length precision within ±2 mil. In particular embodiments, a PCB manufactured using the systems, methods, processes, or principles as described in this disclosure may have at least 10,000 back-drilled plated-through vias which have the maximum stub length of less than 7 mil with a stub length precision within ±2 mil. In particular embodiments, a PCB manufactured using the systems, methods, processes, or principles as described in this disclosure may have at least 100 back-drilled plated-through vias which have the maximum stub length of less than 7 mil with a stub length precision within ±1 mil.

Bandwidth and Bit Rate

In particular embodiments, the maximum stub length of the back-drilled plated-through vias (PTVs) of a PCB may determine the bandwidth or the data rate of the PCB. In particular embodiments, the plated-through vias (PTVs) of the PCBs may be back-drilled to eliminate at least a portion of each stub to reduce the stub length and increase the bandwidth or the data rate of the PCBs. In particular embodiments, the PCBs may have a maximum stub length less than or equal to a specified stub length to allow the PCBs to have a specified data rate. In particular embodiments, a PCB manufactured using the systems, methods, processes, or principles as described in this disclosure may have a maximum stub length of less than or equal to 8 mil and the PCBs may have a data rate of 64 Gbit/s. In particular embodiments, a PCB manufactured using the systems, methods, processes, or principles as described in this disclosure may have a maximum stub length of less than or equal to 4 mil and the PCBs may have a data rate of 128 Gbit/s. In particular embodiments, a PCB manufactured using the systems, methods, processes, or principles as described in this disclosure may have a maximum stub length of 2 mil and the PCBs may have a data rate of 256 Gbit/s. In particular embodiments, the data rate of a PCB manufactured using the systems, methods, processes, or principles as described in this disclosure may be influenced by other parameters associated with the PCBs such as impedances related parameters of the PCB and the design of the PCB.

In particular embodiments, the back-drilled plated-through vias (PTVs) may be produced with the maximum stub length of less than or equal to 6 mil based on inspections by an automated high-speed X-ray inspection system. In particular embodiments, PCBs manufactured using the systems, methods, processes, or principles as described in this disclosure may be high-speed PCBs including, for example, but not limited to: a server back-plane, a line card, a probe card, a cell phone board, or a test board. In particular embodiments, the PCBs may be for the 5G network systems or the server farms which may require faster interconnects for the PCBs. In particular embodiments, the high-speed PCB can effectively handle a DC signal, an AC signal, or a combination of both. In particular embodiments, the high-speed PCB can handle a digital signal, an analog signal, or a combination of both. In particular embodiments, the PCB may have the maximum stub length less than or equal to 6 mil and the PCB may operate at a data rate up to 56 Gbit/s. In particular embodiments, the high-speed PCB may have the maximum stub length less than or equal to 4 mil and the PCB may operate at a data rate up to 112 Gbit/s. In particular embodiments, the PCB may have the maximum stub length to be less than or equal to 2 mil and the PCB may operate at a data rate up to 256 Gbit/s.

PCB Product Defect Rate

In particular embodiments, the X-ray inspection system may non-destructively inspect a PCB with a size of up to 36 inches by 48 inches. In particular embodiments, the X-ray inspection system may inspect PCBs at a speed of up to 500 thousand samples per day. In particular embodiments, the X-ray inspection system may capture X-ray images at a speed of 1 second to 10 seconds per image. In particular embodiments, the PCB products that are manufactured using the systems, methods, processes, or principles as described in this disclosure may have a defect rate of less than or equal to 1 part per thousand based on the X-ray inspection by the X-ray inspection system. In particular embodiments, the PCB products that are manufactured using the systems, methods, processes, or principles as described in this disclosure may have a defect rate of 1 part per billion to 1 part per thousand based on the X-ray inspection by the X-ray inspection system. As an example and not by way of limitation, the defect rate may be less than or equal to approximately 1 part per thousand, 1 part per 10 thousand, 1 part per 100 thousand, 1 part per million, 1 part per 10 million, 1 part per 100 million, or 1 part per billion.

PCB Product Characteristics

In particular embodiments, the PCB may include a number of back-drilled plated-through vias (PTVs). In particular embodiments, the PCB may have at least N number of plated-through vias (PTVs) having the maximum stub length of less than or equal to 6 mil. In particular embodiments, the N number of pated-through vias (PTVs) may have the stub length precision within ±2 mil. In particular embodiments, the PCB may have at least N number of plated-through vias (PTVs) having the stub length precision within ±1 mil. In particular embodiments, the number N may be, for example, but is not limited to, 100, 1000, or 10,000. In particular embodiments, the number N may be any integer greater than or equal to 100. Given the technical difficulties in controlling stub lengths during the manufacturing of PCBs, without in situ or inline X-ray inspection feedback measurements, a product or device including no less than 100 back-drilled plated-through vias (PTVs) and having the maximum stub length of less than or equal to 6 mil for these PTVs could be attainable only by using the systems, methods, processes, or principles as described in this disclosure (e.g., based on the calculated drilling values determined based on the in situ or inline feedback measurements). In particular embodiments, PCBs manufactured using the systems, methods, processes, or principles as described in this disclosure can be identified by comparing the variation of the stub length to a threshold number. In particular embodiments, the threshold number of the variation of the stub length for identifying the PCB can be, for example, but is not limited to, ±1 mil or ±2 mil.

In particular embodiments, the PCBs may have a number of back-drilled plated vias (PTVs) which have back-drill depths customized to the layer thickness at the location of the back-drilled vias (PTVs). In particular embodiments, the variation of the back-drilled vias depths may correspond to the variation of the layer thickness over the same space. In particular embodiments, PCBs having this character of the customized back-drilled vias depths can be identified by comparing the variation of the layer thickness and the variation of the back-drilled vias depths and identifying the correspondence. In particular embodiments, PCBs having this character of the customized back-drilled vias depths can be identified by comparing the layer thickness values and the back-drilled vias depth values and identifying the correspondence. In particular embodiments, PCBs manufactured using the systems, methods, processes, or principles described in this disclosure can be identified by identifying the existence of layer thickness variation and the facts that the stub lengths have a precision of, for example, ±1 mil or ±2 mil. In particular embodiments, the X-ray inspection system may be used to inspect a PCB to identify that the PCB is produced using the customized drilling process based on the inspections of the X-ray inspection system. In particular embodiments, the X-ray inspection system may measure the stub length and the stub length precision for a number of back-drilled stubs of a PCB to identify the fact that the customized drilling process as described in this disclosure has been used during the production process of the PCB. In particular embodiments, the X-ray inspection system may position the X-ray sources and the X-ray detector in specific inspection angle to measure the stub length and the length precision for a number of back-drilled stubs of a PCB. In particular embodiments, the X-ray inspection system may inspect a PCB for both pre-drilling and post-drilling measurement.

PCB Manufacturing Based on Real-Time X-Ray Inspection

Real-Time X-Ray Inspection a. Response Speed of Real-Time X-Ray Inspection

In particular embodiments, the X-ray inspection system and the drilling machine may be integrated in one system. In particular embodiments, the X-ray inspection system may non-destructively inspect the PCB in real-time to measure a number of dimensions related to the PCB or the state of the drilling machine during a drilling process. In particular embodiments, the X-ray inspection and measurement may be in-line and in situ for the drilling machine and the back-drilling process. The X-ray inspection and measurement may be focused in an area of the PCB corresponding to a drilling position (e.g., a location of a plated-through via (PTV)). In particular embodiments, the X-ray inspection tool may calculate the drilling values which are customized based at least on the measured dimension data related to that specific drilling position. In particular embodiments, the drilling machine may receive the calculated drilling values in real-time during the drilling process. In particular embodiments, the drilling machine may drill at respective locations on the PCB using the calculated drilling values. In particular embodiments, the X-ray inspection system may be an automated high-speed X-ray inspection system having a response time of 0.02 seconds to 0.05 seconds. In particular embodiments, a response time may refer to a time duration during which the X-ray inspection system may complete a feedback cycle to provide feedback information (e.g., a calculated drilling value) to the drilling machine. In particular embodiments, the feedback cycle may include, for example, but are not limited to, inspecting the PCB to measure a number of dimensions at pre-determined locations of the PCB, generating a model of the PCB based on the measured dimensions, calculating one or more drilling values based on the model of the PCB, and providing the drilling values to the drilling machine. The response time may indicate how fast the X-ray inspection system can provide feedback to the drilling machine. For example, for a response time of 0.2 seconds, the X-ray inspection system may provide at least one calculated drilling value or other feedback information to the drilling machine every 0.2 seconds. By having such a short response time, the X-ray inspection system may provide real-time feedback information to the drilling machine and may allow the drilling machine to drill plated-through vias (PTVs) with a much higher precision.

b. Real-Time Feedback

Figure 6:
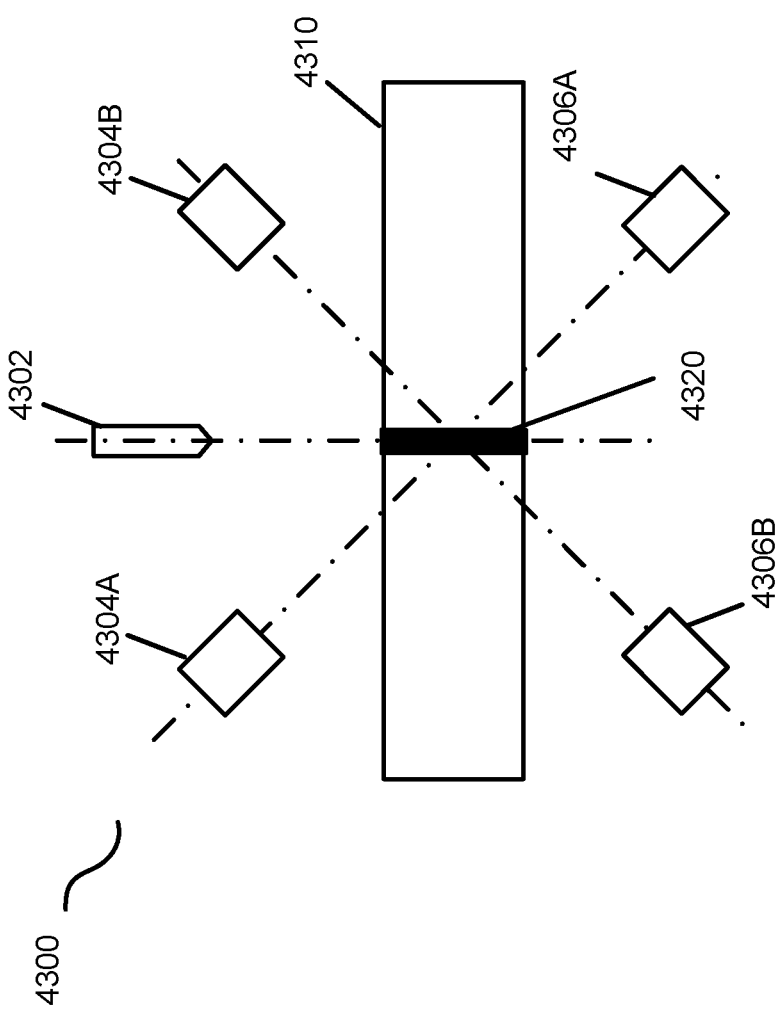
FIG. 6 an example configuration for a drilling machine with real-time feedback from the X-ray inspection system.

FIG. 6 illustrates an example configuration 4300 for a drilling machine with real-time feedback from the X-ray inspection system. As an example and not by way of limitation, the PCB 4310 may have a plated-through via (PTV) 4320. The drill head 4302 may be perpendicular to the surface of the PCB 4310 and may be aligned to the axis of the plated-through via (PTV) 4320. The X-ray inspection tool may include multiple X-ray sources and multiple X-ray detectors. The multiple X-ray sources may include, but are not limited to, a first X-ray source 4304A and a second X-ray source 4304B. The multiple X-ray detectors may include, but are not limited to, a first X-ray detector 4306A and a second X-ray detector 4306B. In particular embodiments, the first X-ray source 4304A may be aligned to the first X-ray detector 4306A along a first axis and the second X-ray source 4304B may be aligned to the second X-ray detector 4306B along a second axis. The first X-ray detector 4306A may detect the X-ray from the first X-ray source 4304A. The second X-ray detector 4306B may detect the X-ray from the second X-ray source 4304B. In particular embodiments, the first axis for the first pair of X-ray source and X-ray detector (4304A, 4306A) and the second axis for the second pair of X-ray source and X-ray detector (4304B, 4306B) may cross each other at an inspected area corresponding to a portion of the PCB containing the plated-through via (PTV) to be drilled with a specific crossing angle. The inspected area of the first and second pairs of the X-ray sources and detectors may cover the drilling position of the drill head which is corresponding to the location of the plated-through via (PTV) 4320. The configuration illustrated in FIG. 6 are for example purpose only and the system is not limited thereto.

In particular embodiments, the system with integrated the automated high-speed X-ray inspection system and the drilling machine may use a two-step drilling process to drill PCBs. In the first step, the drilling machine may drill on the PCB at the location of a specific plated-through via (PTV) for a first drilling depth with a first drilling speed. In the second step, the drilling machine may drill on the PCB at the location of the same plated-through via (PTV) for a second drilling depth with a second drilling speed. In particular embodiments, the second drilling speed may slower than the first drilling speed. In particular embodiments, the second drilling depth may correspond to the ending of the drilling process. In particular embodiments, the second drilling depth may be 4 mil. In particular embodiments, the second drilling depth may be 2 mil. In particular embodiment, the real-time inspections by the X-ray inspection system may be started at the end of the first step and before the second step of the drilling process. In particular embodiments, the second step drilling process of the drilling machine may be actively controlled by the X-ray inspection system in real-time. In particular embodiment, the second step may include receiving the calculated drilling values in real-time and drilling on the PCB using the calculated drilling values. In particular embodiments, the calculated drilling values may be customized based at least on the real-time inspection data.

Figure 7:
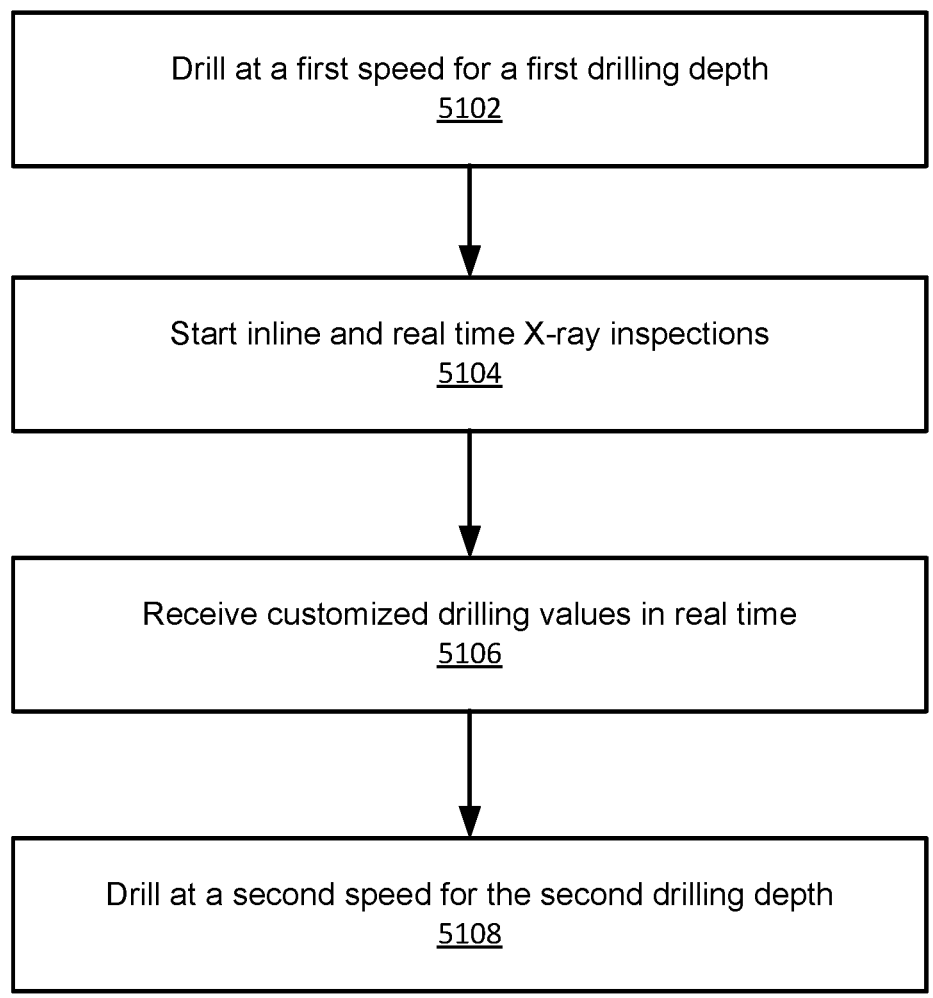
FIG. 7 illustrates an example method for back-drilling the plated-through via based on real-time feedback from the X-ray inspection system

FIG. 7 illustrates an example method 5100 for back-drilling the plated-through via based on real-time feedback from the X-ray inspection system. The method may begin at step 5102, where the drilling machine may drill the plated-through via (PTV) at a first speed for a first drilling depth. In particular embodiments, the first drilling depth may be, but is not limited to a target drilling depth subtracting 4 mil. In particular embodiments, the first drilling depth may be, but is not limited to a target drilling depth subtracting 2 mil. In step 5104, the system may start the inline and real-time inspections by the automated high-speed X-ray inspection system which may calculate the drilling values based on the X-ray inspections and send the calculated drilling values to the drilling machine in real-time. In step 5106, the drilling machine may receive the calculated drilling values from the automated high-speed X-ray inspection system in real-time. In step 5108, the drilling machine may drill the plated-through via (PTV) at a second speed which is slower than the first speed for a second drill depth. In particular embodiments, the second drilling depth may be, but is not limited to, 4 mil, 2 mil, etc.

In particular embodiments, the system with integrated the automated high-speed X-ray inspection system and the drilling machine may use a one-step drilling process for drilling PCBs. In particular embodiment, the drilling process of the drilling machine may be actively controlled based on real-time feedback information from the automated high-speed X-ray inspection system. The drilling machine may drill on the PCB based on the calculated drilling values which are received in real-time from the X-ray inspection system during the drilling process. The calculated drilling values may be customized based at least on the real-time inspection result by the X-ray system. In particular embodiment, the drilling process may be at a constant speed from beginning to end. In particular embodiments, the X-ray inspection system may compensate the back-drill depth for layer-to-layer variations across the PCB with a size up to 36 inches by 48 inches. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for back-drilling the plated-through via based on real-time feedback from the X-ray inspection system including the particular steps of the method of FIG. 7, this disclosure contemplates any suitable method for back-drilling the plated-through via based on real-time feedback from the X-ray inspection system including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

c. Detect Process Variations

In particular embodiments, the X-ray inspection system may detect, in a non-destructive manner, one or more parameter variations related to the PCB manufacturing process. In particular embodiments, the X-ray inspection system may feed the detected variations to the manufacturing process (e.g., in real-time or near real-time). One or more of the manufacturing tools used in the manufacturing process may make corresponding adjustments or changes before the variations cause any defect in the manufactured PCBs. Consequently, the potential defects on the PCB may be avoided. As an example and not by way of limitation, the manufacturing process may be the back-drilling process performed by the drilling machine. The X-ray inspection tool may feed the detected variations to the drilling machine (e.g., in real-time or near real-time). And the drilling machine may make corresponding adjustments based on the detected variations before the variations cause any defect in the PCB being drilled. The X-ray inspection tool may calculate the drilling values based on the detected variations and feed the calculated drilling values to the drilling machine (e.g., in real-time or near real-time). The drilling machine may adjustment one or more drilling parameters based on the calculated drilling values before the variations cause any defect. In particular embodiments, the one or more variations that are detected may be, but are not limited to: a process variation, a structural variation, an apparatus status variation, a system variation, etc. In particular embodiments, the adjustments or changes can be, but are not limited to: an adjustment of a drilling position, an adjustment of a drilling depth, an adjustment of a drilling angle, an adjustment of a drilling speed, a new drill head, etc.

Figure 8:
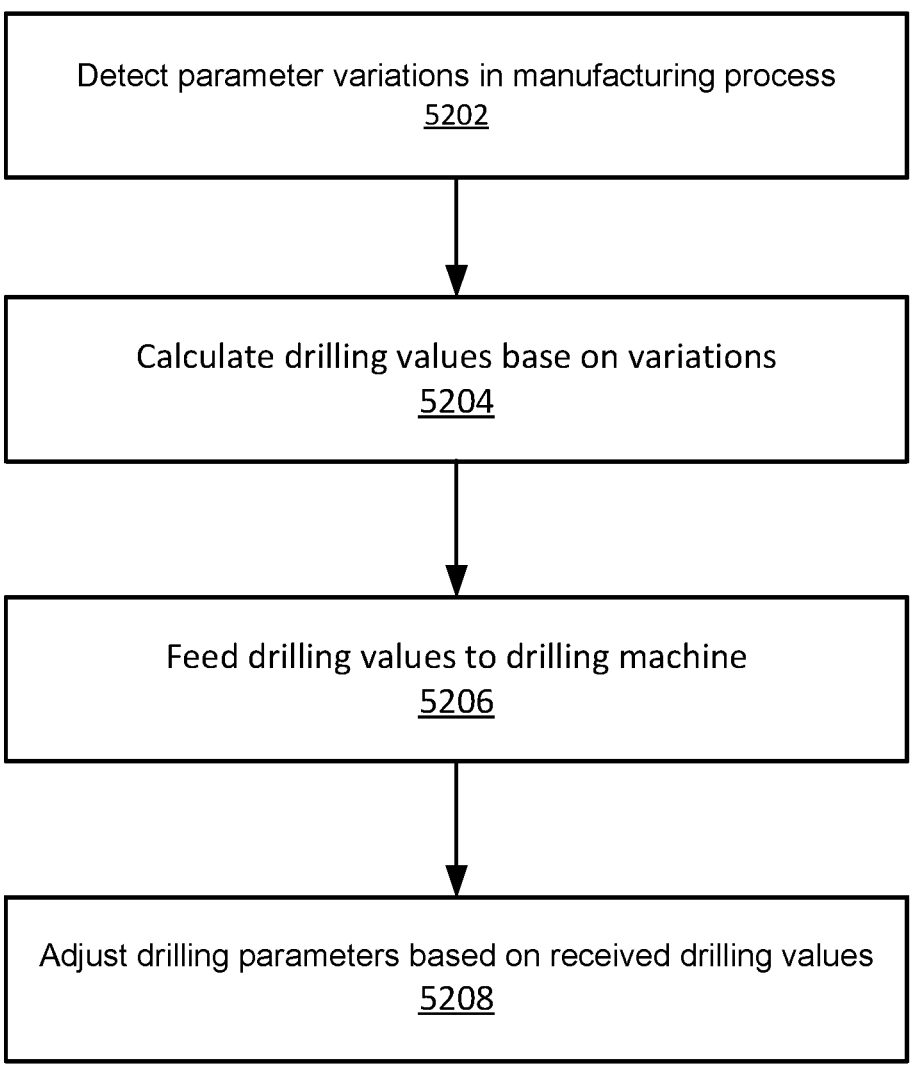
FIG. 8 illustrates an example method for adjusting the drilling process based on the detected parameter variations in the drilling process.

FIG. 8 illustrates an example method 5200 for adjusting the drilling process based on the detected parameter variations in the drilling process. The method may begin at step 5202, where the automated high-speed X-ray inspection system may detect one or more parameter variations related to the back-drilling process of the PCBs. The parameter variations may be variations (e.g., parameter shifting or abrupt changing) that may cause defects in the PCB. The parameter variations may include, for example, but is not limited to, a layer thickness variation of the PCB, a drill head wearing status, a systematical drilling value error (e.g., drilling position error, drilling angle error). In step 5204, the automated high-seed X-ray inspection system may calculate the drilling values based on the detected variations. In step 5206, the calculated drilling values may be fed to the drilling machine (e.g., in real-time or near real-time). In step 5208, the drilling machine may adjust the drilling process based on the received drilling values. Consequently, the potential defects that the parameter variation may cause in the PCB may be avoided by adjusting the drilling process parameters before causing defects.

Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for adjusting the drilling process based on the detected parameter variations in the drilling process including the particular steps of the method of FIG. 8, this disclosure contemplates any suitable method for adjusting the drilling process based on the detected parameter variations in the drilling process including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

PCB Lamination Using Spatially Adaptive Pressure Profile

In particular embodiments, the X-ray inspection system may receive and analyze a design of a PCB and determine a number of locations on the PCB for inspection and measurement. In particular embodiments, the locations may be selected in a way to optimize the accuracy of measurement and to minimize the measurement time consumption. In particular embodiments, the X-ray inspection system may inspect, in a non-destructive manner, the PCB to measure a number of dimensions at the pre-determined locations during the manufacturing process (e.g., a lamination process) of the PCB. In particular embodiments, the dimensions to be measured may include, for example, but are not limited to, a layer thickness of each layer of the printed circuit board, a distance between any two layers of the printed circuit board, a trace width and a trace thickness of a conductive trace, or a spacing between any two conductive traces. In particular embodiments, the X-ray inspection system may generate a data set or model for the PCB based on the measured dimension data. In particular embodiments, the model of the PCB may be a 3D model. In particular embodiments, the PCB model may include a layer height map for each PCB layer.

In particular embodiments, the X-ray inspection system may generate a spatially adaptive pressure profile for the PCB based on the PCB model or/and the layer height map of the PCB. In particular embodiments, the spatially adaptive pressure profile may be applied by a lamination machine to the PCB during the lamination process. In particular embodiments, the lamination machine may have a pressure late including a number of cell plates on which the spatially adaptive pressure profile may be applied. In particular embodiments, different pressure may be applied on different cell plates. In particular embodiments, the pressure may be applied on the pressure plates during a heated process. In particular embodiments, the inspections and measurement by the X-ray inspection system may be in real-time during the PCB lamination process. In particular embodiments, the X-ray inspection system may generate and update the model and the spatially adaptive pressure profile of the PCB based on the real-time inspections. In particular embodiments, the X-ray inspection system may provide feedback information for actively controlling the spatially adaptive pressure profile of the lamination machine based on the real-time inspection. In particular embodiments, the X-ray inspection system may detect variations of one or more dimensions of the printed circuit board. In particular embodiments, the X-ray inspection system may modify the model and the spatially adaptive pressure profile based on the detected dimension variations. In particular embodiments, the X-ray inspection system may generate the PCB model and the spatially adaptive pressure profile using the artificial intelligence (AI) module or/and the machine learning (ML) algorithm.

Figure 9:
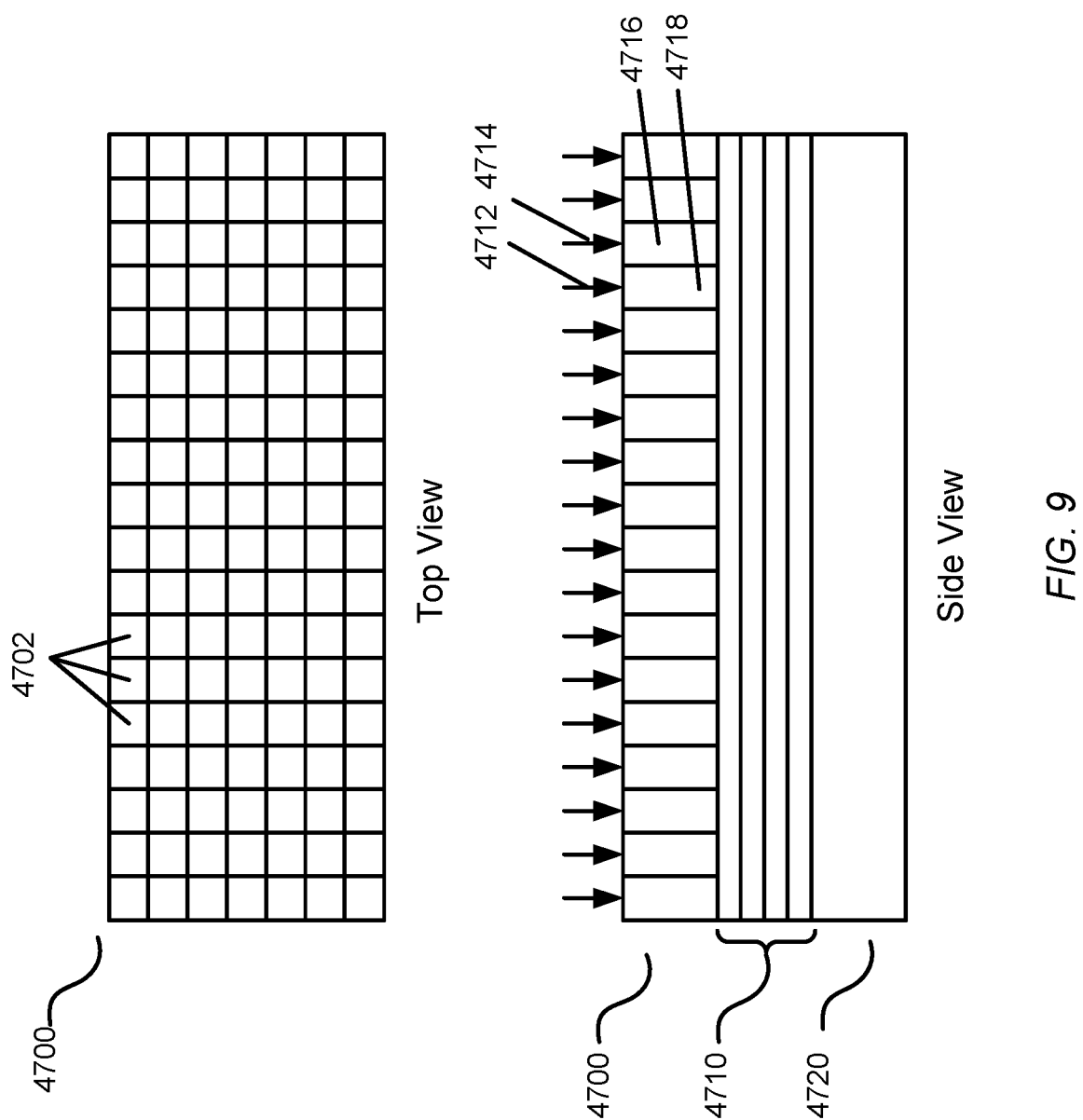
FIG. 9 illustrates an example pressure plate including a number of cell plates for customized lamination process of a printed circuit board.

FIG. 9 illustrates an example pressure plate 4700 including a number of cell plates for customized lamination process of a printed circuit board. The pressure plate 4700 may have a number of cell plates, for example, the cell plates 4702. Each of the cell plates may be applied with a different pressure of the spatially adaptive pressure profile. In the side view figure of FIG. 9, the pressure plate 4700 may be put on the top of the PCB 4710 which is on the top of the support 4720. The cell plates in the pressure plates may receive different pressure values forming the spatially adaptive pressure profile for the PCB 4710. For example, the cell plate 4718 may receive a first pressure 4712 which is different from the cell plate 4716 which may receive a different pressure 4714. The number of the cell plates, the layer number of the printed circuit board, the configurations illustrated in FIG. 9 are for example purpose only and are not limited thereto. In particular embodiments, the pressure plate may have different number of cell plates corresponding to the spatial resolution of the spatially adaptive pressure profile. The pressure plate illustrated in FIG. 9 are for example purpose only and the PCB lamination machine is not limited thereto.

Figure 10:
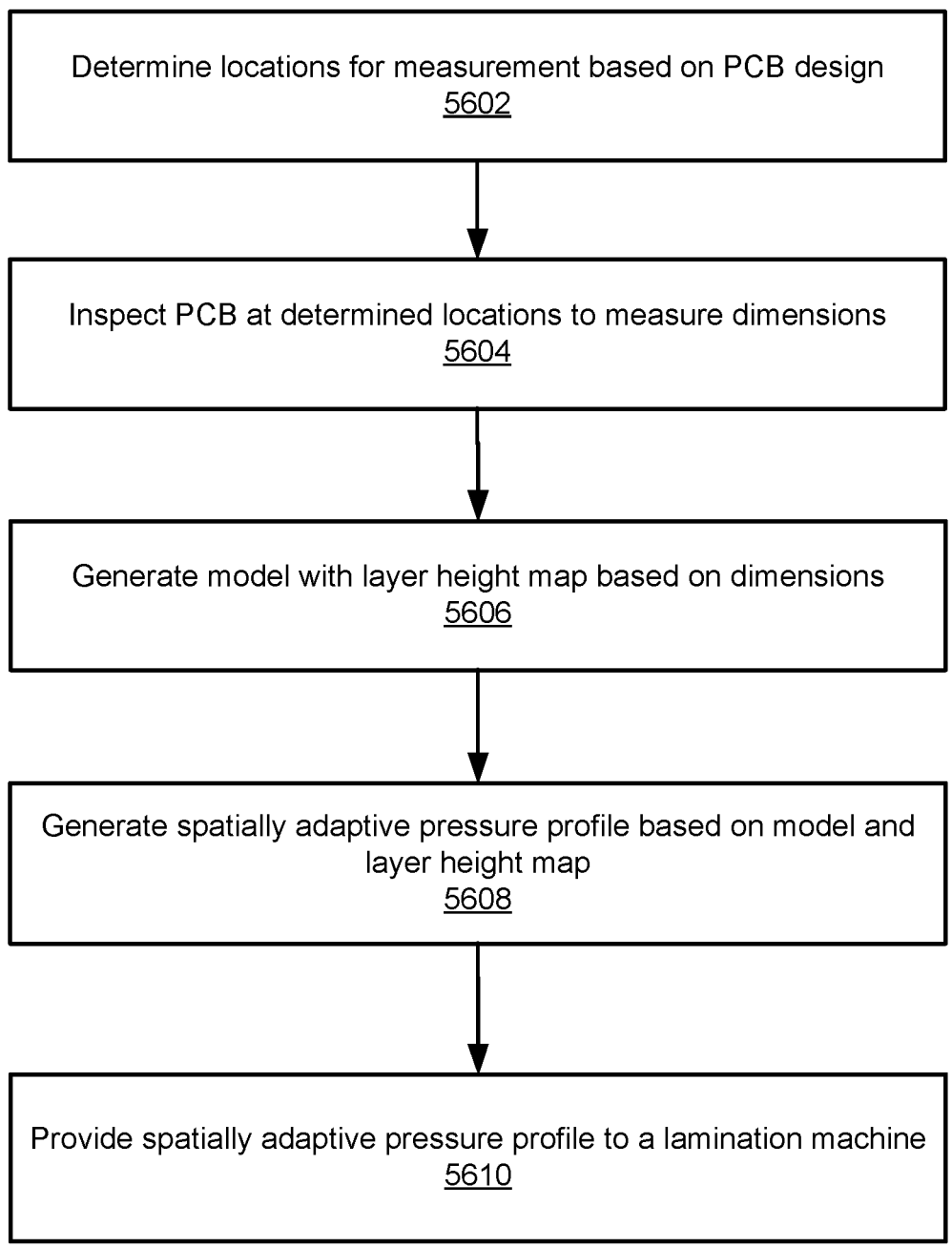
FIG. 10 illustrates an example method for controlling lamination process using a spatially adaptive pressure profile.

FIG. 10 illustrates an example method 5600 for controlling printed circuit board lamination process using a spatially adaptive pressure profile. The method may begin at step 5602, where the automated high-speed X-ray inspection system may determine a number of locations on a PCB for inspection and measurement based on the design of the PCB. The locations may be determined to optimize the accuracy of the measurement and minimize the time consumption of the measurement. In step 5604, the X-ray inspection system may inspect the PCB at the pre-determined locations to measure a number of dimensions. In step 5606, the X-ray inspection system may generate a 3D model for the PCB based on the measured dimension data. The 3D model may include a layer height map for each layer of the PCB. In step 5608, the X-ray inspection system may generate the spatially adaptive pressure profile based on the 3D model or/and the layer height map of the PCB. In step 5610, the X-ray inspection system may provide the spatially adaptive pressure profile to the lamination machine. The lamination machine may apply the spatially adaptive pressure profile to the pressure plate by applying each pressure value to a corresponding cell plate. The PCB manufactured using the spatially adaptive pressure profile may have a high precision in the layer thickness and layer spacing. In particular embodiments, by using the spatially adaptive pressure profile, the printed circuit board may have the layer thickness precision and the layer distance precision with ±2 mil. In particular embodiments, by using the spatially adaptive pressure profile, the printed circuit board may have the layer thickness precision and the layer distance precision within ±1 mil.

Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for controlling printed circuit board lamination process using a spatially adaptive pressure profile including the particular steps of the method of FIG. 10, this disclosure contemplates any suitable method for controlling printed circuit board lamination process using a spatially adaptive pressure profile including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Advantages: Inspection Speed

A significant advantage of this invention is that an extended source of X-rays can be used, increasing the available flux of X-rays used for imaging. This in turn increases the throughput possible for the system. Put another way, in the time to acquire a single inspection image with a PPM system, the proposed invention can acquire over 300,000 images with the same resolution.

Consider the following comparison with the PPM X-ray system. The time to acquire an image depends on the flux $\Phi$ of X-rays:

$$T_{acquire} = (P_\# \times X_P)/\Phi$$

where $P_\#$ is the number of pixels, $X_P$ is the number of X-rays per pixel, and $\Phi$ is the X-ray flux. The X-ray flux from a point source is:

$$\text{Flux} = \Phi = \beta \times \Omega \times S_A$$

where $\beta$ is the point source brightness, $\Omega$ is the angular distribution in mrad$^2$ and $S_A$ is the point source area $S_A = \pi r^2$. The source spot size for X-ray systems is typically defined using the ASTM standard SE-1165 ["Standard Test Method for Measurement of Focal Spots of Industrial X-ray Tubes by Pinhole Imaging," ASTM Committee E-7 on Nondestructive Testing, May 15, 1992].

A typical X-ray source brightness is $$\beta = 10^8 \text{ X-rays/sec/mm}^2/\text{mrad}^2.$$

To avoid parallax errors in automated inspection, the PPM X-ray beam should be well collimated; a divergence of 20 mrad is typical. For a point source with $$\Omega = (20 \text{ mrad})^2 = 400 \text{ mrad}^2$$

and a source spot diameter d=2r=1 μm=$10^{-3}$ mm, the flux is given by:

$$\begin{aligned}
\text{Flux} = \Phi &= \beta \times \Omega \times S_A \\
&= 10^8 \times 400 \times \pi \times [0.5 \times 10^{-3}]^2 \text{ X-rays/sec} \\
&= 400 \times \pi \times 0.25 \times 10^8 \times [10^{-3}]^2 \text{ X-rays/sec} \\
&= 400 \times \pi \times 25 \text{ X-rays/sec} \\
&= 31{,}416 = 3.14 \times 10^4 \text{ X-rays/sec.}
\end{aligned}$$

A typical X-ray image sensor may have 512×512 pixels that need 1,000 X-rays/pixel for image formation. An image for a PPM system will therefore be collected in approximately 8,350 seconds, or 2.3 hours.

On the other hand, keeping the same source brightness, but illuminating with a larger source spot size according to the invention dramatically increases the X-ray flux illuminating the object. As an example, assume a source with a 1 mm diameter (r=0.5 mm) separated by 100 mm from the object and, furthermore, assume that the distance from the object to scintillator is 100 microns. The angular divergence of the X-ray beam is given by:

α=1 mm/100 mm=10 mrad, making

Ω=100 mrad².

The spot area is=π×[0.5]²=0.785 mm², so the flux becomes:

Flux = Φ = 10⁸ × 100 × 0.785 photons/sec

= 7.85 × 10⁹ photons/sec which is higher than the PPM configuration by a factor of 250,000 times. Therefore, the same 512×512 image (with 1,000 X-rays per pixel) can now be produced at high speed and, for example, may now have a proportionally faster image collection time of approximately 33 msec.

As a practical matter, the throughput enhancement may be further reduced by a factor of between 2 and 10 from this number. A PPM imaging system can detect X-rays in the enlarged shadow image directly with a CCD X-ray detector, which can have a quantum efficiency between 50% to 100%. The typical X-ray CCD array comprises an array of pixels, with a pixel size of approximately 100 μm×100 μm.

In comparison, the high-resolution direct-shadow images for the system of the disclosed invention come from an extended X-ray source, and are not magnified. The pixels of contemporary X-ray imaging detectors are far too large to resolve the proximity images. Instead, the invention disclosed here comprises a scintillator to convert the X-rays to optical photons, and then magnifies this optical image.

In order to achieve a particular resolution, there may be thickness specifications for the scintillator. For a resolution of 1 micron, for example, the scintillator may have a specified thickness between 1 and 10 microns. For thin scintillators, some of the incident X-rays will pass through the scintillator without being absorbed. Therefore, the quantum efficiency of this conversion process may be worse than the PPM system, emitting visible photons for approximately 20% of the X-rays passing through the scintillator. Beyond this, the microscope may lose additional photons, depending on the optical system NA and the quantum efficiency of the visible CCD detector. However, even with these losses, the benefit provided by the higher flux of the extended source still provides a significant advantage.

Advantages: Imaging Resolution

The resolution of the prior art PPM system is determined by the spot size of the X-ray source. For example, a source with a 1 micron spot size will produce images with 1 micron resolution, assuming the system is operating at optimal resolution. Practically speaking, it is difficult to achieve resolution much below 1 micron with a PPM system, due to rapidly decreasing efficiency of the X-ray source for small spot sizes. As the spot size of the X-ray source decreases, the X-ray power must be reduced to avoid melting the X-ray target. Furthermore, the X-ray target must be made thinner, to reduce scattering in the target. As a result, for each 2× decrease in spot size, the flux from the source decreases a factor of about 2× to 4×. Overall, the throughput may decrease at least 8× for a 2× improvement in resolution.

For the imaging system according to the invention, the scintillator is in close proximity to the object being examined, and photons emitted are in proportion to the X-rays. For the optical system that relays the photons emitted by the scintillator to the detector, assuming a scintillator emission wavelength of λ=535 nm and a solid immersion optical system with NA≈1.75 comprising LuAG optical elements with refractive index n=1.84, the definition for the diffraction-limited resolution R of the optical system relaying scintillator photons to the detector is:

$$R = \frac{\lambda}{2*NA} = \frac{535 \text{ nm}}{2*1.75} = 153 \text{ nm}$$

which is 6.5 times smaller than the 1 micron resolution of the PPM system.

Advantages: Time to Market

The high speed at which non-destructive images at resolutions smaller than 50 microns can be gathered can improve the time to market for the development of manufacturing processes such as the flip chip interconnect (FCI) process described earlier. The destructive processes for failure analysis, also described earlier, can take weeks to collect a single image, and months to acquire statistical data on parts. Because of the rapid time in which images can be collected and analyzed using the system of the present invention, process development time for such products can be counted in days, and is typically a fraction of the total time required to design and bring to market a new product.

Furthermore, because of the enhanced resolution, the present invention can be used for the new FCI processes with pitches smaller than 50 microns. The present invention can be used for significantly smaller pitches, and still maintain the desired image resolution and speed. In terms of the product development cycle, an increase in time for feedback of one to several weeks has a distinct and significant impact on the time required to develop a new product. In a simple case, perhaps three to five cycles of setup and data collection may be sufficient to establish a process for a new device. In a more complex case, such as a high-density interposer or a 3D IC, tens or hundreds of iterations may be required. Without the present invention, each of these cycles may take several weeks, and the total time to market of the product may come to be dominated by these cycles. Clearly a method of determining the quality of fine pitch (50 microns and smaller) bonds at the time of processing offers a significant advantage.

The images and calculations produced by the system and methods disclosed herewith allow the quality of bonds to be examined immediately after bonding in a matter of seconds or minutes. In order to develop and qualify a new semiconductor product for mass production, many individual processes and the integration of these processes must be established, tuned, and tested. In the case of forming a through-silicon via (TSV) in a semiconductor wafer, the process flow typically requires that the vias be formed first and the capture pads be subsequently formed on the wafer surface over the vias. Since the capture pads obscure optical inspection of the vias themselves, in the absence of the present invention, the alignment between the vias and the capture pads may not be accurately determined at the time of manufacturing without cutting the silicon wafer and inspecting this feature in cross-section. Since this procedure is time consuming and also destroys the silicon wafer and any economic value contained within it, it is therefore undesirable.

In the case of bonding two or more chips or substrates or even complete wafers together using FCI, the alignment, bonding force, bonding temperature, rate of heating, and rate of cooling among other factors must be tightly controlled. While control of manufacturing equipment and processes can enable some of the necessary control, inspection and measurement of features within the product that are not optically visible may also be required. Without the use of the apparatus disclosed in this invention, assembled parts must be cross-sectioned in order to be inspected. Given the fine pitch of the interconnect bonds and the very large quantity of connections, this procedure can take several weeks. Typically only a very small subset of the total interconnect bonds may actually be inspected.

The inability to inspect bonds quickly can add significantly to the length of time required to fine tune both individual process steps as well as the integration of multiple process steps to create a finished product. For example, consider a case where 25 iterations of the bonding process are required to develop and qualify a product. In the case without the apparatus disclosed in this invention, each iteration may require 1 week to build each group of samples under various process and tooling configurations. After manufacturing a group of samples, an additional 2 weeks may be required to cross-section individual units and inspect the quality and attributes of the bonds that have been created. The total time is therefore: 25 cycles×(1 week making+2 weeks inspection)=75.0 weeks.

With the use of the apparatus disclosed in this invention, the 2 weeks of inspection can be reduced to a few minutes by eliminating the need for time consuming cross-sectioning. The total time for the sequential cycles may now be calculated as: 25 cycles×(1 week making+1 hour inspection) =25.15 weeks, a reduction by 49.85 weeks (or 66% of the initial time to market). With high-volume consumer electronic devices such as mobile phones selling in volumes of more than 100 million units a year, it can be easily seen that a decrease in time to market by 50 weeks (almost one year) can have significant impact on the market. The apparatus may further be integrated into the bonding tool or via filling tool, for example the electrochemical deposition tool, to provide feedback to the bonding process in real-time. The use of the apparatus in this way reduces time to market by many weeks and may in fact enable a product to enter the market that otherwise would be too costly or too late to market to have economic value.

Advantages: Product Yield and Cost

It has been reported that commercial production began on these devices with overall yields related to package assembly and interconnect in the range of 80%. This yield is far lower than typically accepted in the semiconductor field, and there is considerable additional cost associated with the scrap material. However, this particular part was determined to have such high commercial value that, even considering the cost associated with low yield, it was commercially feasible to produce with only 80% package assembly yield. In other lower-cost, more consumer-oriented segments of the market, pressure on pricing is much more intense, and it is unlikely that a product with package assembly yields at this level could be commercially viable. For this reason, it is necessary for the manufacturing process to be highly capable and tightly controlled, such that the amount of scrap product or yield loss resulting from the bonding process is reduced. Traditionally, package assembly yields are in the 98 to 99% range. Those skilled in the art will quickly realize that scrapping good chips by using poorly yielding bonding techniques, and packaging yields of 80% for lower value chips, are simply not acceptable.

It should be noted that, in the case of multiple dice mounted together either as a 3D IC or onto a high-density interposer, the failure of one connection on any chip will result in the scrapping of the entire MCP or package assembly. There may be thousands or tens of thousands of connections that must all function as designed. It is rare that any kind of rework or recovery of materials can be accomplished if any of the bonds are not produced correctly. For example, take the case when a processor chip with a cost of $10 is mounted together with four memory chips costing $5 each, or $20. The total cost of the chips is therefore $30. Chip assembly and packaging may add another $5 of cost for a total assembly cost of $35.

By using the images and measurements produced by the apparatus in this disclosure, the processes of aligning, inspection bonding can be controlled and monitored such that the yield can be rapidly increased. For MCP packages, in the example above, detecting a flaw between the first two dice will allow the packaging assembler to scrap the first two die only, and not require the loss of all five dice, therefore saving scrap costs and improving yield. It is common for well-controlled and monitored assembly processes to have yields of over 99.9%. The present invention allows a packaging assembler to achieve a yield of greater than or equal to 90% in MCP structures having more than 4 dice and having more than 100 TSVs per interposer or die layer at pitches where the smallest pitch is less than 100 microns. The same yield advantage may be achieved in the flip chip configuration having more than 400 microbumps at a pitch where the smallest pitch is less than 100 microns.

This same advantage in cost and yield can be seen at other steps in the manufacturing process for fine-pitch interposers and 3D die stacking, such as via fill monitor for voids, via capture pad alignment to via, alignment of chip-bump to chip or interposer pad, and quality of completed joint after bonding. It may also be used to measure bondline in the assembly of multiple slices of silicon devices or fine pitch interposers or between silicon devices and other materials of interest where this bondline thickness is critical to device performance.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an automated high-speed X-ray inspection system:
   nondestructively inspecting a printed circuit board including a plurality of plated through vias, with a size of up to 36 inches by 48 inches to measure a plurality of dimensions including at least a stub length for the plated through vias of the printed circuit board using an X-ray source of electromagnetic radiation;
   generating a data set for the printed circuit board based on the plurality of measured dimensions in less than about ten (10) seconds;
   calculating one or more drilling values based on a comparison of the measured stub lengths of the plated through vias of the printed circuit board and a predetermined range; and
   providing, to a drilling machine, in real-time with at least the calculating step, instructions for back-drilling a plurality of plated-through vias to within the predetermined range based on the calculated drilling values for the printed circuit board.

2. The method of claim 1, wherein the one or more drilling values are customized based on one or more localized parameters of the printed circuit board at respective drilling locations.

3. The method of claim 1, wherein the one or more drilling values comprise one or more of: a drilling depth, a drilling position, a drilling angle, a drilling speed, a drill head length, a drill head diameter, or a drill head type.

4. The method of claim 1, further comprising:
   automatically analyzing one or more X-ray images to inspect the plurality of plated-through vias of the printed circuit board; and
   automatically identifying one or more defects associated with one or more plated-through vias of the plurality of plated-through vias based on the analysis on the one or more X-ray images.

5. The method of claim 4, wherein the one or more defects comprise one or more of: an under-drilled stub, an over-drilled plated-through via, a misaligned drilling position, a drilling error, a stub sleeve, a broken drill, a layer delamination, a warpage, a layer misalignment, or a sintering defect.

6. The method of claim 4, further comprising:
   measuring a stub length of a plated-through via; and
   determining the stub length of the plated-through via being with a pre-determined range.

7. The method of claim 4, further comprising:
   determining one or more dimensions associated with the one or more plated-through vias that are associated with the one or more defects;
   calculating one or more new drilling values for the one or more plated-through vias based on the determined one or more dimensions;
   providing, to the drilling machine, new instructions for re-drilling the one or more plated-through vias that are associated with the one or more defects based on the new drilling values.

8. The method of claim 7, wherein the one or more defects comprises one or more of: a misaligned drilling location, an under-drilled plated-through via, a first defect caused by an incorrect drilling angle, a second defect caused a broken drill head, or a conductive sleeve.

9. The method of claim 1, wherein the back-drilled plated-through vias have a maximum stub length of less than or equal to 6 mil.

10. The method of claim 1, wherein the printed circuit board has a defect rate of less than or equal to 1 part per thousand.

11. The method of claim 1, wherein the back-drilled plated-through vias have a maximum stub length of less than or equal to 4 mil and a stub length precision within ±1 mil.

12. The method of claim 1, wherein the back-drilled plated-through vias have a maximum stub length of 2 mil to 6 mil and a stub length precision within ±1 mil.

13. A method comprising, by an automated high-speed X-ray inspection system:
   generating a first X-ray image in less than about (10) seconds using an X-ray source of electromagnetic radiation of a printed circuit board including a plurality of plated through vias, with a size of up to 36 inches by 48 inches at a first direction;
   identifying, from the first X-ray image, a plurality of plated-through vias of the printed circuit board;
   measuring one or more dimensions or features associated with each identified plated-through via based on the first X-ray image including at least a stub length; and
   identifying one or more defects associated with one or more identified plated-through vias based on corresponding measured dimensions or features in comparison to a pre-determined range for the stub length.

14. The method of claim 13, further comprising classifying, using a classification algorithm, the one or more defects into respective defect categories.

15. The method of claim 13, further comprising:
   generating a second X-ray image of the printed circuit board at a second direction; and
   identifying one or more defects associated with one or more plated-through vias based on a comparison of the first X-ray image and the second X-ray image.

16. The method of claim 13, further comprising:
   calculating one or more drilling values based on the identified defects associated with the one or more plated-through vias; and
   providing, to a drilling machine, instructions for re-drilling the one or more plated- through vias based on the calculated drilling values for the printed circuit board.

17. An automated high-speed X-ray inspection system comprising one or more processors; and one or more computer-readable non-transitory storage media coupled to one or more of the processors and comprising instructions operable when executed by one or more of the processors to cause the system to:
   nondestructively inspect a printed circuit board including a plurality of plated through vias, using an X-ray source of electromagnetic radiation to measure a plurality of dimensions including at least a stub length for the plated through vias at a plurality of pre-determined locations of the printed circuit board;

generate a data set for the printed circuit board based on the plurality of measured dimensions in less than about ten (10) seconds;

calculate one or more drilling values based on a comparison of the measured stub lengths of the plated through vias of the printed circuit board and a predetermined range; and provide, to the drilling machine, in real-time with at least the calculate step, instructions for back-drilling a plurality of plated-through vias to within the predetermined range based on the calculated drilling values for the printed circuit board.

18. An automated high-speed X-ray inspection system comprising one or more processors; and one or more computer-readable non-transitory storage media coupled to one or more of the processors and comprising instructions operable when executed by one or more of the processors to cause the system to:

generate a first X-ray image of a printed circuit board, using an X-ray source of electromagnetic radiation, at a first direction;

identify, from the first X-ray image, a plurality of plated-through vias of the printed circuit board;

measure one or more dimensions or features associated with each identified plated-through via based on the first X-ray image including at least a stub length; and identify one or more defects associated with one or more identified plated-through vias based on corresponding measured dimensions in comparison to a predetermined range for the stub length.

19. A printed circuit board comprising (1) a plurality of layers, (2) a plurality of conductive traces, and (3) a plurality of back-drilled plated-through vias, each back-drilled plated-through via having at least one stub portion, the stub portion being produced with a maximum stub length of less than or equal to 6 mil based on inspections by an automated high-speed X-ray inspection system, the printed circuit board being produced by a process comprising the steps of:

inspecting, by the automated high-speed X-ray inspection system in less than about ten (10) seconds using an X-ray source of electromagnetic radiation, the printed circuit board to measure a plurality of dimensions at a plurality of pre-determined locations of the printed circuit board including the stub length;

generating a data set for the printed circuit board based on the plurality of measured dimensions;

calculating one or more drilling values based on a comparison of the measured stub lengths of the plated through vias of the printed circuit board to a predetermined range to identify deviant plated-through vias; and drilling, during a back-drill process of a drilling machine and on the printed circuit board, a plurality of deviant plated-through vias based on the calculated drilling values, wherein the back-drilled plated-through vias have a maximum stub length of less than or equal to 6 mil following the drilling.

20. The printed circuit board of claim 19, wherein the plurality of dimensions comprise one or more of:
a layer thickness of any layer of the printed circuit board;
a first distance between any two layers of the plurality layers of the printed circuit board;
a trace width, a trace thickness, or a trace length of any conductive trace of the plurality of conductive traces;
a second distance between any two conductive traces of the plurality of conductive traces;
a drilling position, a drilling depth, a drilling angle, a back-drilled stub length; or a thickness of a substrate.

21. The printed circuit board of claim 20, wherein the plurality of dimensions further comprise a third distance between any two features of a plurality of features, wherein the plurality of features comprise one or more of:
a layer of the plurality of layers of the printed circuit board;
a conductive trace of the plurality of conductive traces;
a plated-through via of the plurality of plated-through vias;
a back-drilled stub of a plurality of back-drilled stubs;
a die of a plurality of dies;
a component of a plurality of components; or
an interconnect of a plurality of interconnects.

22. The printed circuit board of claim 19, wherein the first, second, and third distance are one of a vertical distance, a lateral distance, or a three-dimensional distance.

23. The printed circuit board of claim 19, wherein the data set comprises a three- dimensional model of the printed circuit board.

24. The printed circuit board of claim 23, wherein the three-dimensional model comprises a first group of dimensions corresponding to the plurality of pre-determined locations of the printed circuit board and a second group of dimensions corresponding to locations beyond the plurality of pre-determined locations of the printed circuit board, wherein the second group of dimensions is calculated based on the measured dimensions.

25. The printed circuit board of claim 23, wherein the step of calculating comprises generating a virtual cross section of the printed circuit board based on the three-dimensional model, wherein the virtual cross section of the printed circuit board can be any cross section of the printed circuit board corresponding to a drilling position.

26. The printed circuit board of claim 19, wherein the inspections are real-time, inline, and non-destructive and the drilling values are automatically fed to the drilling machine in real-time.

27. The printed circuit board of claim 26, wherein the automated high-speed X-ray inspection system comprises:
a first X-ray source;
a first X-ray detector;
a second X-ray source; and
a second X-ray detector;
wherein the first X-ray source is aligned with the first X-ray detector along a first axis and the second X-ray source is aligned with the second X-ray detector along a second axis, and
wherein the first axis and the second axis cross each other at a portion of the printed circuit board containing a drill position.

28. The printed circuit board of claim 26, wherein the step of drilling comprises:
drilling, during the back-drill process of the drilling machine and on the printed circuit board, a plated-through via of the plurality of plated-through vias at a first drilling speed for a first drilling depth;
receiving, in real-time, the one or more drilling values from the automated high-speed X- ray inspection system; and
drilling, during the back-drill process of the drilling machine and on the printed circuit board, the plated-through via of the plurality of plated-through vias at a second drilling speed for a second drilling depth based on the one or more drilling values, wherein the second speed is less than the first speed.

29. The printed circuit board of claim 28, wherein the second drilling depth is 4 mil.

30. The printed circuit board of claim 28, wherein the second drilling depth is 2 mil.

31. The printed circuit board of claim 26, wherein the step of drilling comprises:
   receiving, in real-time, the one or more drilling values from the automated high-speed X-ray inspection system; and
   drilling, during the back-drill process of the drilling machine and on the printed circuit board, the plurality of plated-through vias based on the one or more drilling values.

32. The printed circuit board of claim 26, wherein the steps further comprises:
   detecting, in a non-destructive manner and by the automated high-speed X-ray inspection system, one or more variations of the printed circuit board;
   calculating, in real-time, the drilling values based on the detected variations; and
   adjusting, in real-time and by drilling machine, the back-drill process based on the calculated drilling values before the variations cause any defect.

33. The printed circuit board of claim 32, wherein the one or more variations comprises one or more of: a process variation; a structural variation; or a system variation.

34. The printed circuit board of claim 32, wherein adjusting the back-drill process comprises adjusting one or more of: a drilling position; a drilling depth; a drilling angle; a drilling speed; or a drill head.

35. The printed circuit board of claim 26, wherein the automated high-speed X-ray inspection system has a response time of 0.02 seconds to 0.05 seconds.

36. The printed circuit board of claim 19, wherein the automated high-speed X-ray inspection system is used for customizing the back-drill drilling process as well as for inspecting the printed circuit board for quality control.

37. The printed circuit board of claim 36, wherein the automated high-speed X-ray inspection system non-destructively detects one or more of: an under-drilled stub; an over-drilled plated-through via; a drilling error; a stub sleeve; a broken drill; a layer delamination; a warpage; a layer misalignment; or a sintering defect.

38. The printed circuit board of claim 19, wherein the automated high-speed X-ray inspection system non-destructively inspects the printed circuit board having a first dimension up to 36 inches and a second dimension up to 48 inches.

39. The printed circuit board of claim 19, wherein the automated high-speed X-ray inspection system inspects the printed circuit board at a first speed up to 500 thousands samples per day, and wherein the automated high-speed X-ray inspection system captures images at a second speed of 5-10 seconds per image.

40. The printed circuit board of claim 19, wherein each stub portion has the maximum stub length of less than or equal to 6 mil, and wherein the printed circuit board operates at a data rate up to 56 Gbit/s.

41. The printed circuit board of claim 40, wherein each stub portion has a stub length within 4 mil±2 mil.

42. The printed circuit board of claim 19, wherein each stub portion has the maximum stub length of less than or equal to 4 mil, and wherein the printed circuit board operates at a data rate up to 112 Gbit/s.

43. The printed circuit board of claim 42, wherein each stub portion has a stub length within 3 mil±1 mil.

44. The printed circuit board of claim 19, wherein each stub portion has the maximum stub length of less than or equal to 2 mil, and wherein the printed circuit board operates at a data rate up to 256 Gbit/s.

45. The printed circuit board of claim 19, wherein the back-drilled plated-through vias have a plurality of impedances being independent of locations over the printed circuit board, and wherein each of the impedances is tuned at least in part by one or more stub lengths of one or more associated stubs.

46. The printed circuit board of claim 19, wherein the printed circuit board comprises at least 100 back-drilled plated-through vias having the maximum stub length of less than or equal to 6 mil with a stub length precision within ±2 mil.

47. The printed circuit board of claim 19, wherein the printed circuit board comprises at least 100 back-drilled plated-through vias having the maximum stub length of less than or equal to 6 mil with a stub length precision within ±1 mil.

48. The printed circuit board of claim 19, wherein the printed circuit board is a high-speed printed circuit board being one of: a server back-plane; a line card; a probe card; a cell phone board; or a test board.

49. The printed circuit board of claim 19, wherein the automated high-speed X-ray inspection system comprises an artificial intelligence (AI) module and a machine learning (ML) algorithm.

50. The printed circuit board of claim 49, wherein inspecting comprises:
   capturing, by the automated high-speed X-ray inspection system, a plurality of images of the printed circuit board; and
   measuring, by the automated high-speed X-ray inspection system, the plurality of dimensions based on the captured images using the artificial intelligence (AI) module and the machine learning (ML) algorithm.

51. The printed circuit board of claim 49, wherein calculating comprises:
   analyzing the data set of the printed circuit board using the artificial intelligence (AI) module and the machine learning (ML) algorithm; and
   determining the drilling values using the artificial intelligence (AI) module and the machine learning (ML) algorithm.

52. The printed circuit board of claim 49, wherein drilling comprises:
   receiving, from the automated high-speed X-ray inspection system, the drilling values; and
   drilling, during the back-drill process of the drilling machine and on the printed circuit board, the plurality of plated-through vias based on the received drilling values and a real-time analysis by the artificial intelligence (AI) module and the machine learning (ML) algorithm.

53. A printed circuit board comprising (1) a plurality of layers, (2) a plurality of conductive traces, and (3) a plurality of back-drilled plated-through vias, each back-drilled plated-through via having at least one stub portion, the stub portion being produced with a maximum stub length of less than or equal to 6 mil, the printed circuit board being produced with a defect rate less of than or equal to 1 part per thousand based on inspections by an automated high-speed X-ray inspection system, the printed circuit board being produced by a process comprising the steps of:
   inspecting, by the automated high-speed X-ray inspection system using an X-ray source of electromagnetic radiation, the printed circuit board to measure a plurality of dimensions at a plurality of pre-determined locations of the printed circuit board;

generating a data set for the printed circuit board based on the plurality of measured dimensions;

calculating one or more drilling values based on a comparison of the measured stub lengths of the plated through vias of the printed circuit board and the maximum stub length to identify one or more defective plated through vias; and drilling, during a back-drill process of a drilling machine and on the printed circuit board, a plurality of corrected plated-through vias based on the calculated drilling values, wherein the back-drilled plated-through vias have the maximum stub length of less than or equal to 6 mil, and wherein the printed circuit board has the defect rate of less than or equal to 1 part per thousand.

54. The printed circuit board of claim 53, wherein the inspections are real-time, inline, and non-destructive and the drilling values are automatically fed to the drilling machine in real-time.

55. The printed circuit board of claim 54, wherein the automated high-speed X-ray inspection system comprises: a first X-ray source, a first X-ray detector, a second X-ray source, and a second X-ray detector, wherein the first X-ray source is aligned with the first X-ray detector along a first axis and the second X-ray source is aligned with the second X-ray detector along a second axis, wherein the first axis and the second axis cross each other at a portion of the printed circuit board containing a drill position.

56. The printed circuit board of claim 54, wherein the step of drilling comprises:

drilling, during the back-drill process of the drilling machine and on the printed circuit board, a plated-through via of the plurality of plated-through vias at a first drilling speed for a first drilling depth;

receiving, in real-time, the one or more drilling values from the automated high-speed X-ray inspection system; and drilling, during the back-drill process of the drilling machine and on the printed circuit board, the plated-through via of the plurality of plated-through vias at a second drilling speed for a second drilling depth based on the one or more drilling values, wherein the second speed is less than the first speed.

57. The printed circuit board of claim 54, wherein the step of drilling comprises:

receiving, in real-time, the one or more drilling values from the automated high-speed X- ray inspection system; and drilling, during the back-drill process of the drilling machine and on the printed circuit board, the plurality of plated-through vias based on the one or more drilling values.

58. The printed circuit board of claim 53, wherein the steps further comprises:

detecting, in a non-destructive manner and by the automated high-speed X-ray inspection system, one or more variations of the printed circuit board;

calculating, in real-time, the drilling values based on the detected variations; and adjusting, in real-time and by drilling machine, the back-drill process based on the calculated drilling values before the variations cause any defect.

59. The printed circuit board of claim 58, wherein the one or more variations comprises one or more of: a process variation; a structural variation; or a system variation.

60. The printed circuit board of claim 58, wherein adjusting the back-drill process comprises adjusting one or more of: a drilling position; a drilling depth; a drilling angle; a drilling speed; or a drill head.

61. The printed circuit board of claim 58, wherein the automated high-speed X-ray inspection system has a response time from 0.02 seconds to 0.05 seconds.

62. A printed circuit board comprising (1) a plurality of layers, (2) a plurality of conductive traces, and (3) a plurality of back-drilled plated-through vias, each back-drilled plated-through via having at least one stub portion, the stub portion being produced with a maximum stub length of less than or equal to 4 mil and a stub length precision within ±1 mil based on inspections by an automated high-speed X-ray inspection system, the printed circuit board being produced by a process comprising the steps of:

inspecting, by the automated high-speed X-ray inspection system in less than about ten (10) seconds using an X-ray source of electromagnetic radiation, the printed circuit board to measure a plurality of dimensions at a plurality of pre-determined locations of the printed circuit board;

generating a data set for the printed circuit board based on the plurality of measured dimensions identifying one or more defective drilled-through plated vias having a maximum stub length of greater than 4 mil and a stub length precision outside of ±1 mil;

calculating one or more drilling values based on the data set of the printed circuit board to correct the defective drilled-through plated vias stub lengths; and drilling, during a back-drill process of a drilling machine and on the printed circuit board, a plurality of corrected plated-through vias based on the calculated drilling values, wherein the corrected back-drilled plated-through vias have the maximum stub length of less than or equal to 4 mil with the stub length precision within ±1 mil.

63. A printed circuit board comprising (1) a plurality of layers, (2) a plurality of conductive traces, and (3) a plurality of back-drilled plated-through vias, each back-drilled plated-through via having at least one stub portion, the stub portion being produced with a maximum stub length of 2 mil to 6 mil and a stub length precision within ±1 mil based on inspections by an automated high-speed X-ray inspection system, the printed circuit board being produced by a process comprising the steps of:

inspecting, by the automated high-speed X-ray inspection system in less than about ten (10) seconds using an X-ray source of electromagnetic radiation, the printed circuit board to measure a plurality of dimensions at a plurality of pre-determined locations of the printed circuit board;

generating a data set for the printed circuit board based on the plurality of measured dimensions identifying one or more defective drilled-through plated vias having a maximum stub length of greater than 6 mil or less than 2 mil and a stub length precision outside of ±1 mil;

calculating one or more drilling values based on the data set of the printed circuit board to correct the defective drilled-through plated vias stub lengths; and drilling, during a back-drill process of a drilling machine and on the printed circuit board, a plurality of corrected plated-through vias based on the calculated drilling values, wherein the corrected back-drilled plated-through vias have the maximum stub length of 2 mil to 6 mil and the stub length precision within ±1 mil.

64. A printed circuit board comprising (1) a plurality of layers, (2) a plurality of conductive traces, and (3) a plurality of back-drilled plated-through vias, each back-drilled plated-through via having at least one stub portion, the stub portion being produced with a maximum stub length of less than or equal to 6 mil, the printed circuit board being produced with a defect rate less of than or equal to 1 part per thousand based on inspections by an automated high-speed X-ray inspection system, the printed circuit board being produced by a process comprising the steps of:
- inspecting, by the automated high-speed X-ray inspection system using an X-ray source of electromagnetic radiation, the printed circuit board to measure a plurality of dimensions at a plurality of pre-determined locations of the printed circuit board;
- generating a data set for the printed circuit board based on the plurality of measured dimensions identifying one or more defective drilled-through plated vias having a maximum stub length of greater than 6 mil;
- calculating one or more drilling values based on the data set of the printed circuit board to correct the defective drilled-through plated vias stub lengths; and
- drilling, during a back-drill process of a drilling machine and on the printed circuit board, a plurality of corrected plated-through vias based on the calculated drilling values, wherein the corrected back-drilled plated-through vias have the maximum stub length of less than or equal to 6 mil, and wherein the printed circuit board has the defect rate of less than or equal to 1 part per thousand.

65. The printed circuit board of claim 53, wherein the inspections are real-time, inline, and non-destructive and the drilling values are automatically fed to the drilling machine in real-time.

66. The printed circuit board of claim 54, wherein the automated high-speed X-ray inspection system comprises: a first X-ray source, a first X-ray detector, a second X-ray source, and a second X-ray detector, wherein the first X-ray source is aligned with the first X-ray detector along a first axis and the second X-ray source is aligned with the second X-ray detector along a second axis, wherein the first axis and the second axis cross each other at a portion of the printed circuit board containing a drill position.

67. The printed circuit board of claim 54, wherein the step of drilling comprises:
- drilling, during the back-drill process of the drilling machine and on the printed circuit board, a plated-through via of the plurality of plated-through vias at a first drilling speed for a first drilling depth;
- receiving, in real-time, the one or more drilling values from the automated high-speed X-ray inspection system; and
- drilling, during the back-drill process of the drilling machine and on the printed circuit board, the plated-through via of the plurality of plated-through vias at a second drilling speed for a second drilling depth based on the one or more drilling values, wherein the second speed is less than the first speed.

68. The printed circuit board of claim 54, wherein the step of drilling comprises:
- receiving, in real-time, the one or more drilling values from the automated high-speed X-ray inspection system; and
- drilling, during the back-drill process of the drilling machine and on the printed circuit board, the plurality of plated-through vias based on the one or more drilling values.

69. The printed circuit board of claim 53, wherein the steps further comprises:
- detecting, in a non-destructive manner and by the automated high-speed X-ray inspection system, one or more variations of the printed circuit board;
- calculating, in real-time, the drilling values based on the detected variations; and
- adjusting, in real-time and by drilling machine, the back-drill process based on the calculated drilling values before the variations cause any defect.

70. The printed circuit board of claim 58, wherein the one or more variations comprises one or more of: a process variation; a structural variation; or a system variation.

71. The printed circuit board of claim 58, wherein adjusting the back-drill process comprises adjusting one or more of: a drilling position; a drilling depth; a drilling angle; a drilling speed; or a drill head.

72. The printed circuit board of claim 58, wherein the automated high-speed X-ray inspection system has a response time from 0.02 seconds to 0.05 seconds.

73. A printed circuit board comprising (1) a plurality of layers, (2) a plurality of conductive traces, and (3) a plurality of back-drilled plated-through vias, each back-drilled plated-through via having at least one stub portion, the stub portion being produced with a maximum stub length of less than or equal to 4 mil and a stub length precision within ±1 mil based on inspections by an automated high-speed X-ray inspection system, the printed circuit board being produced by a process comprising the steps of:
- inspecting, by the automated high-speed X-ray inspection system in less than about ten (10) seconds using an X-ray source of electromagnetic radiation, the printed circuit board to measure a plurality of dimensions at a plurality of pre-determined locations of the printed circuit board;
- generating a data set for the printed circuit board based on the plurality of measured dimensions identifying one or more defective drilled-through plated vias having a maximum stub length of greater than 6 mil;
- calculating one or more drilling values based on the data set of the printed circuit board to correct the defective drilled-through plated vias stub lengths; and
- drilling, during a back-drill process of a drilling machine and on the printed circuit board, a plurality of corrected plated-through vias based on the calculated drilling values, wherein the corrected back-drilled plated-through vias have the maximum stub length of less than or equal to 4 mil with the stub length precision within ±1 mil.

74. A printed circuit board comprising (1) a plurality of layers, (2) a plurality of conductive traces, and (3) a plurality of back-drilled plated-through vias, each back-drilled plated-through via having at least one stub portion, the stub portion being produced with a maximum stub length of 2 mil to 6 mil and a stub length precision within ±1 mil based on inspections by an automated high-speed X-ray inspection system, the printed circuit board being produced by a process comprising the steps of:
- inspecting, by the automated high-speed X-ray inspection system using an X-ray source of electromagnetic radiation, the printed circuit board to measure a plurality of dimensions at a plurality of pre-determined locations of the printed circuit board;
- generating a data set for the printed circuit board based on the plurality of measured dimensions identifying one or more defective drilled-through plated vias having a maximum stub length of greater than 6 mil or less than 2 mil and a stub length precision outside of ±1 mil;

calculating one or more drilling values based on the data set of the printed circuit board to correct the defective drilled-through plated vias stub lengths; and drilling, during a back-drill process of a drilling machine and on the printed circuit board, in real-time with at least the calculating step, a plurality of corrected plated-through vias based on the calculated drilling values, wherein the corrected back-drilled plated-through vias have the maximum stub length of 2 mil to 6 mil and the stub length precision within ±1 mil.

75. The method of claim 1, wherein the inspecting step is performed with a single X-ray detector in a transmission geometry in which the source and detector are on opposite sides of the printed circuit board.

76. The method of claim 1, wherein the data set is a grayscale image having a dynamic range greater than 10,000 levels (14-bits).

77. The method of claim 13, wherein the inspecting step is performed with a single X-ray detector in a transmission geometry in which the source and detector are on opposite sides of the printed circuit board.

78. The method of claim 13, wherein the data set is a grayscale image having a dynamic range greater than 10,000 levels (14-bits).

* * * * *